United States Patent [19]
Hines

[11] Patent Number: 6,111,563
[45] Date of Patent: Aug. 29, 2000

[54] CORDLESS RETROREFLECTIVE OPTICAL COMPUTER MOUSE

[76] Inventor: Stephen P. Hines, 4525-B San Fernando Rd., Glendale, Calif. 91204

[21] Appl. No.: 08/958,631

[22] Filed: Oct. 27, 1997

[51] Int. Cl.$^7$ .................................................. G09G 5/08
[52] U.S. Cl. ......................... 345/166; 345/158; 345/163; 345/164; 345/165
[58] Field of Search .................................. 345/163–166, 345/158, 169, 157

[56] References Cited

U.S. PATENT DOCUMENTS

| | | | |
|---|---|---|---|
| 4,521,772 | 6/1985 | Lyon | 345/166 |
| 4,553,842 | 11/1985 | Griffin | 356/375 |
| 4,751,505 | 6/1988 | Williams et al. | 345/166 |
| 4,754,268 | 6/1988 | Mori | 345/163 |
| 4,794,384 | 12/1988 | Jackson | 345/166 |
| 4,880,968 | 11/1989 | Kwang-Chien | 250/221 |
| 4,920,260 | 4/1990 | Victor et al. | 250/221 |
| 4,922,236 | 5/1990 | Heady | 345/166 |
| 4,935,619 | 6/1990 | Heberle | 250/221 |
| 5,027,109 | 6/1991 | Donovan et al. | 345/165 |
| 5,045,843 | 9/1991 | Hansen | 345/158 |
| 5,086,197 | 2/1992 | Liou | 178/18 |
| 5,274,361 | 12/1993 | Snow | 345/166 |
| 5,349,371 | 9/1994 | Fong | 345/166 |
| 5,355,241 | 10/1994 | Kelley | 359/170 |
| 5,517,211 | 5/1996 | Kwang-Chien | 345/166 |
| 5,670,990 | 9/1997 | Bidiville et al. | 345/164 |
| 5,764,395 | 6/1998 | Iwata | 359/172 |
| 5,796,387 | 8/1998 | Curran et al. | 345/158 |
| 5,821,922 | 10/1998 | Sellers | 345/157 |
| 5,900,958 | 5/1999 | Nakamura | 359/159 |
| 5,926,264 | 7/1999 | Beale et al. | 356/152.1 |

OTHER PUBLICATIONS

Standards Coordinating Committee 10, The IEEE Standard Dictionary of Electrical and Electronics Terms, IEEE Std 100–1996, Sixth Edition.

*Primary Examiner*—Richard A. Hjerpe
*Assistant Examiner*—Henry N. Tran
*Attorney, Agent, or Firm*—John E. Wagner

[57] ABSTRACT

An optical reflective mouse or other pointing device for computers which provide an optical signal. The mouse modifies, e.g., interrupts, the optical signal from the computer as a function of the mouse movement or operation of one or more control buttons.

The mouse reflects or retroreflects the modified optical signal to the computer as a computer control signal. The mouse employs retroreflectors, diffraction gratings, prisms, mirrors and other optical elements in combination with a mouse ball operator to complete the mouse. No electronics, radiation sources or batteries or any cable connection to the computer is required.

41 Claims, 11 Drawing Sheets

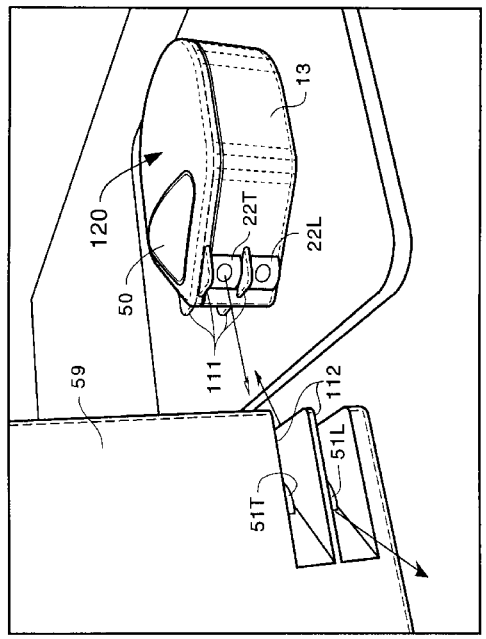
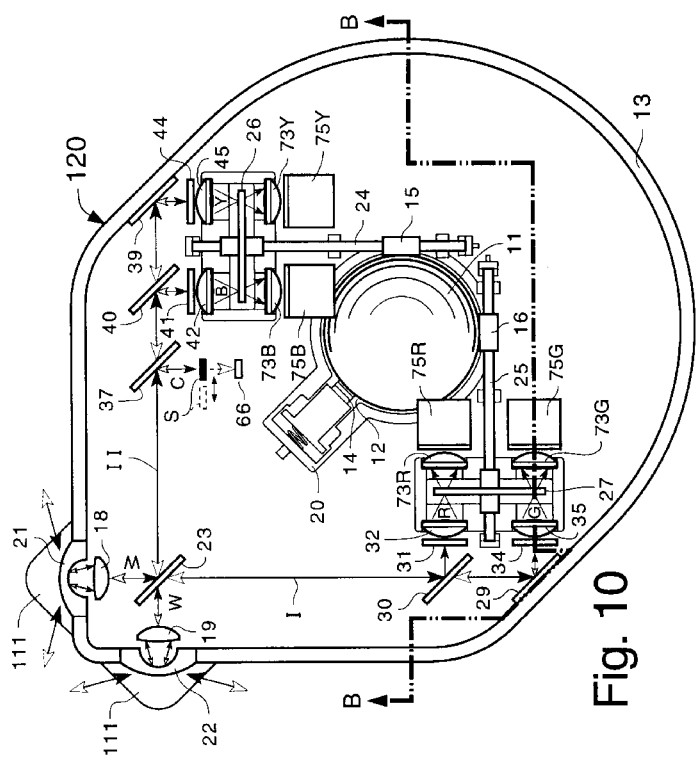
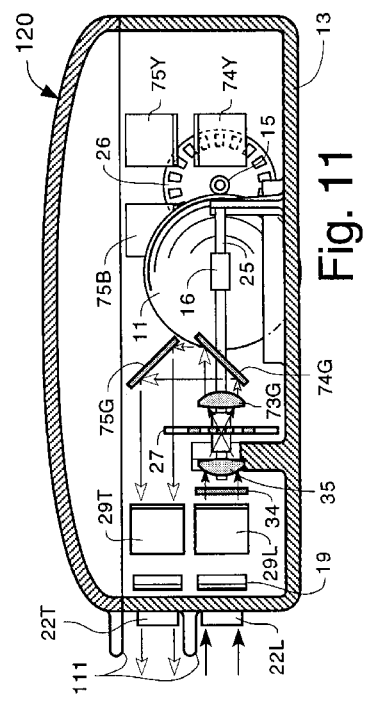
Fig. 12
Fig. 10
Fig. 11

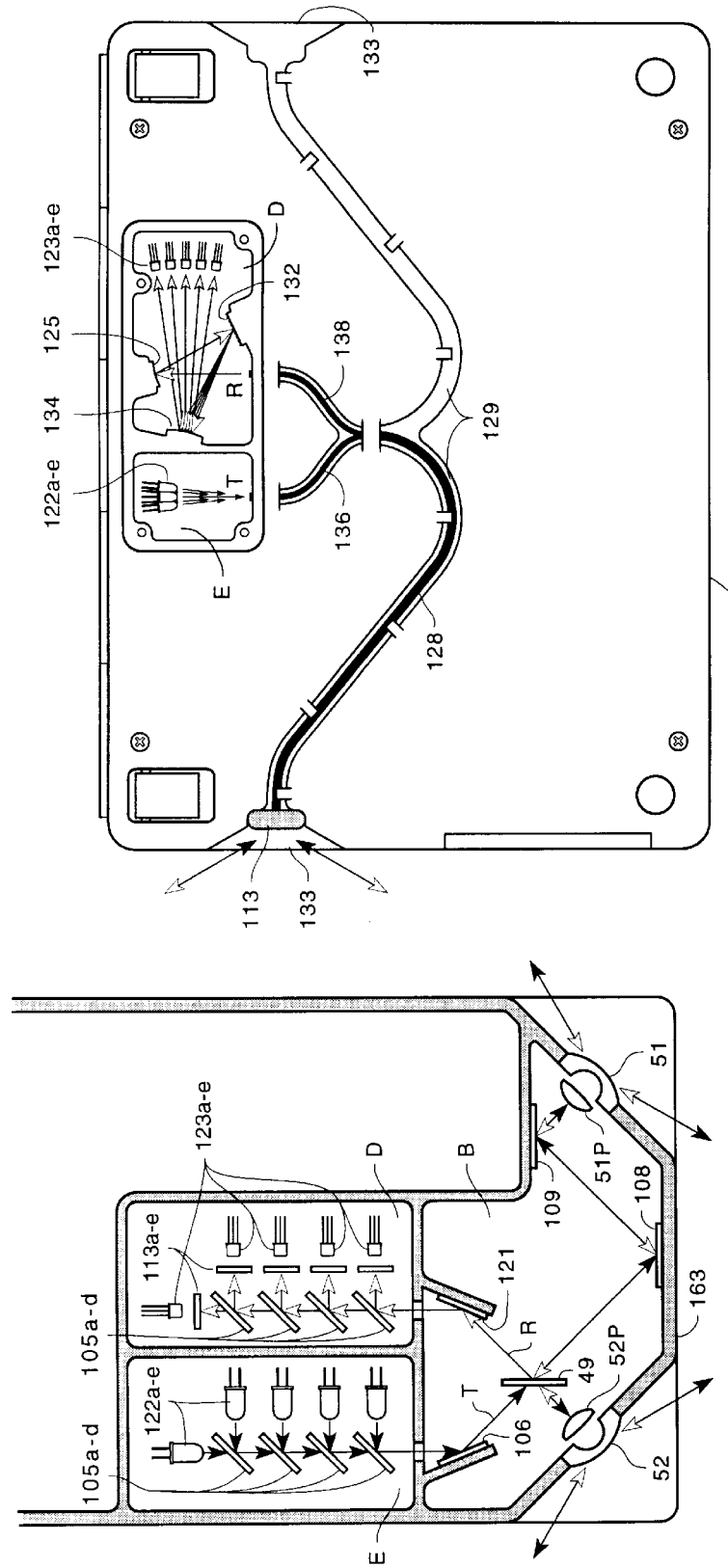

CORDLESS RETROREFLECTIVE OPTICAL COMPUTER MOUSE

BACKGROUND OF THE INVENTION

In recent years in the development of computer technology, the alphanumeric keyboard has been augmented by input devices which are used to position the cursor on a monitor screen for selecting icons by the operation of a switch. The most common such input device is the mouse. Hardly a personal computer today is found without a mouse or other pointing device which allows the mouse or pointing device to control certain functions of the computer.

The mouse, being a hand operated device used on the horizontal work surface near the keyboard and monitor, must be connected by a cable which unfortunately limits the range of the movement of the mouse. The cable which supplies operating power to the mouse also receives signals from the mouse about its position and user commands.

The mouse typically includes a ball which rolls on a surface or mouse pad. The ball is coupled to optical chopper wheels within the mouse housing which respond to movement of the mouse to produce pulses of light representing mouse movement. This is all well known conventional mouse technology.

Inside the mouse, electrical power, is converted to light by four light emitting diodes (LED's), two each at two orthoginally-oriented chopper wheels. As the mouse is moved on a surface, the chopper wheels rotate in correspondence with the lateral or longitudinal components of motion of the mouse. Light is intermittently blocked by spokes of the chopper wheels, or projected through the holes in the chopper wheels, where it is detected by the photo detectors within the mouse and converted back to electrical signals representing mouse movement. Command signals are usually in the form of switch operations by the user. Mice heretofore have been electro/optical/mechanical devices.

It would be highly desirable to provide a mouse or other pointing device which performed the same functions but without a cable connection to the computer. Several attempts have been made to accomplish this objective but none have met wide success.

Some cordless mice have been developed which communicate with the computer with an infrared or radio signal generated in the mouse, similar to appliance remote controls; however, all have also been electro/optical/mechanical devices, in which internal batteries provide an electrical charge for a limited time before they must be recharged, interrupting use of the computer and inconveniencing the user. Further, batteries add weight to the mouse and increase the mass and inertia, causing fatigue to the computer user. While cordless mice eliminate the inconvenience and restrictions of a cord, they nevertheless are heavier, more complicated and more expensive than corded mice.

There also exists a continuing need for improved low cost optical systems which use a minimum of refractive elements, e.g., lenses or prisms. In connection with meeting the need of a low cost cordless purely reflective computer mouse, it is also an objective of this invention to produce a general purpose optical system totally devoid of refractive elements.

BRIEF DESCRIPTION OF THE INVENTION

The subject of this invention is an optically retroreflective non-electrical mouse or pointing device which contains only a housing, the mouse ball, its rollers, and simple passive optical elements so that the only input to the mouse is light or an optical beam from the computer which the mouse intermittently reflects back to the computer where it is detected. The mobility of the mouse is limited only to an unobstructed line-of-sight path between the mouse and the light source typically in the base of the desktop or notebook computer. In principle, this invention is an optically retroreflective mouse.

The mouse of this invention contains standard light chopper wheels plus simple optical elements such as mirrors, retroreflectors, beamsplitters, filters, prisms, diffraction gratings, or lenses, some of which may be inexpensively molded into the mouse. Necessary mouse button operations may be accomplished by a simple shutter which permits a momentary flash of light to indicate actuation.

An object of this invention is a cordless opto/mechanical retroreflective computer mouse which does not contain any electronics or power sources.

Typically, optical instruments require precise alignment between all optical elements for proper operation. The cordless mouse and mouse controller of this invention, constitute both ends of an optical system for which it would seem that precise alignment of the mouse, relative to the computer, would be required in order to receive a return signal at the computer. To solve this problem retroreflectors, rather than simple mirrors, are used in the mouse at the chopper wheels and mouse-button, because retroreflectors return light, nominally to the source, within a wide cone angle.

The send-receive optics on the mice and computers of this invention share the property of receiving and radiating light over a wide fan-shaped horizontal angle in the same space between the computer and mouse, but reducing the horizontal spread to essentially a collimated pencil beam within the computer and mouse which can be used by the prism, diffraction grating, etc. The angular position of this collimated white-light beam is shown in mice in the average, on-axis position as if coming from the mid-position relative to the mouse send-receive optics. When the incident optical beam reaches the mouse off axis, the white-light beam which emerges out of the wide-angle send-receive optics in the mouse slightly angularly misaligned, although the angular misalignment is greatly reduced due to the nature of the wide-angle optics. Nevertheless, the amount that the optical paths in the mice are angularly shifted, is related to the horizontal magnification ratio of the relative to the computer.

The white light, after being spectrally separated in the mouse, varies its angular path, in the horizontal plane, and its incident angle on the retroreflectors at the button shutter and chopper wheels. The incident angle of light at the retroreflective is not predictable as being perpendicular to the retroreflector. Therefore, first surface mirrors are a poor choice to be used. Retroreflectors can retroreflect light over a fairly wide angle and can easily handle the modest incident angles used in the optical mice. By way of contrast, retroreflectors can easily reflect light within the modest incident angle and return that light along its incident path, out of the wide-angle optics of the mouse, which increase the angle to match the outside incident angle, and back to the computer.

One embodiment of this invention includes means for receiving broad-spectrum light from a source typically in the base of the computer or possibly a separate cabled mouse controller housing. Within the mouse, the received light is separated into multiple discrete wavelengths, or colors, and directed optically with mirrors at necessary positions, two each at two chopper wheels. The light is modulated, i.e., intermittently blocked or projected through holes in the chopper wheels, where it is retroreflected back through the optical system, out of the mouse and back to the computer. Color-specific photo detectors in the computer sense the presence or absence of the return signal (colored light of preselected wavelengths) and allow the computer to interpret the longitudinal and lateral movement of the mouse to move a cursor appropriately on the computer monitor, or to affect such other computer options.

All of the electronic components used with this mouse are located in the computer, or a separate mouse controller, and none are in the mouse, track ball or pointing device. The optical elements which serve as the light receptors preferably are shielded from interference from direct ambient light. One or more wide-angle lenses are typically located at the front corners of the computer to project and receive light pulses to and from the mouse. The light radiation from the computer is preferably produced by a broad-spectrum light source such as an incandescent lamp or a plurality of discrete wavelength light emitting diodes (LED's) of, for example, five non-interfering wavelengths, and is irradiated over an area corresponding to the normal range of mouse movement. This area is termed the optical field of the computer.

Typically, four optical return signals are used for defining the X and Y positions of the mouse. In addition, one light signal is used for each mouse button. A one-button mouse returns a total of five optical signals. A two-button mouse provides six return signals, etc. The mouse button actuates a simple camera-type shutter, which is in the optical path of a discrete color, to allow a flash of that color to be retroreflected to the computer. The colors preferably should not be visible, typically being produced with a filtered incandescent lamp or infrared and/or ultraviolet LED's or laser diodes emitting radiation outside of the visible spectrum.

Return light from the mouse enters the wide-angle lens acting as receiving means in the base of the computer and is directed to a number of photo detectors each sensitive to a selected color or of a corresponding LED. Each detected return radiation sequence constitutes an optical command signal for the computer which becomes an optically controlled computer.

The components of the mouse preferably are oriented at 45° with respect to the longitudinal axis of the mouse to work for both right and left-handed people. Cylindrical lenses are used on the outside of the mouse and the computer to receive and project light in a flat fan shape, across the surface where the mouse will be used. The light sources in the computer themselves can be pulsed with unique signatures to help differentiate the return signals from each other and ambient room light (optical noise).

The connection between the mouse and the computer is optical, requiring only line of sight communication. Basically, the computer serves to emit light to, and to detect retroreflected light from, the mouse. The mouse serves to modulate light by returning, or not returning the light back to the computer by interrupting or chopping specific colors in response to the direction and extent of mouse movement as well as manual operation of the mouse button.

Various techniques are possible in both the computer and mouse for achieving their assigned functions. From an appearance point of view, it may be desirable, but not essential, to have the computer and mouse communicate with non-visible forms of energy, for example, in the infrared band. However, to facilitate description, white light and visible colors will be used to describe the operation of the mouse.

The light source can be a broad spectral source such as an incandescent lamp or multiple LED's of discrete colors. In both the mouse and detector portion of the computer the combined broad-spectrum light signal can be spectrally separated with a variety of techniques, such as:

a. beamsplitting white light with a series of 45° dichroic cube prism or plate-type beamsplitters;
 b. reflecting white light off of a diffraction grating;
 c. transmitting white light through a transmission diffraction grating;
 d. transmitting white light through a triangular prism, to be refracted into the spectrum; and
 e. transmitting white light through a variable interference filter in a spectrum of colors.

In all cases listed above, where necessary, narrow band-pass optical filters can be used in the separated optical paths, in the mouse and in the detection area of the computer, to optically isolate the desired color. This allows detectors to provide typically five discrete signals in response to mouse operation.

In addition, a cylindrical negative lens or cylindrically convexed mirror can be used to spread the fan-angle of the spectrum to more easily intercept individual colors.

It is also possible following the teaching of this invention to achieve a cordless optical mouse or pointing device which is not only free of electrical or electronic parts but free of any refractive optical elements. This is achieved in part through the use of wide angle cylindrical reflectors used off axis in pairs having the effect of narrowing the angle of incoming light into a virtual zero angle beam which is the equivalent of an optical slit. This combination allows the wide-angle incoming reflected beams to pass through a narrow lensless opening or window in the housing.

BRIEF DESCRIPTION OF THE DRAWINGS

The foregoing invention in may be more clearly understood from the following brief description with reference to the drawing in which:

FIG. 10 is a top plan view of another embodiment of the mouse of this invention, with the cover removed, showing dual level optics for vertically displaced entrance and return optical paths;

FIG. 11 is a vertical sectional view of the mouse taken along line B—B of FIG. 10 showing the entrance optical path to the chopper wheels and the return path from the chopper wheels out of the mouse;

FIG. 12 is a perspective pictorial representation of the computer and mouse of FIGS. 10 and 11;

FIG. 13 is a fragmentary transverse sectional view through the base of a computer in accordance with this invention showing LED's and dichroic beamsplitters in the emitter section, and photodetectors, dichroic beamsplitters, and narrow bandpass filters in the detector section;

FIG. 14 is a view of the underside of another computer embodiment with cover panel removed showing spectrally different LED's directing colored light toward the ends of one or more optical fibers which guide the light for projection toward the mouse, and a detection section containing a spectrometer;

DETAILED DESCRIPTION OF THE INVENTION

Figure 1:
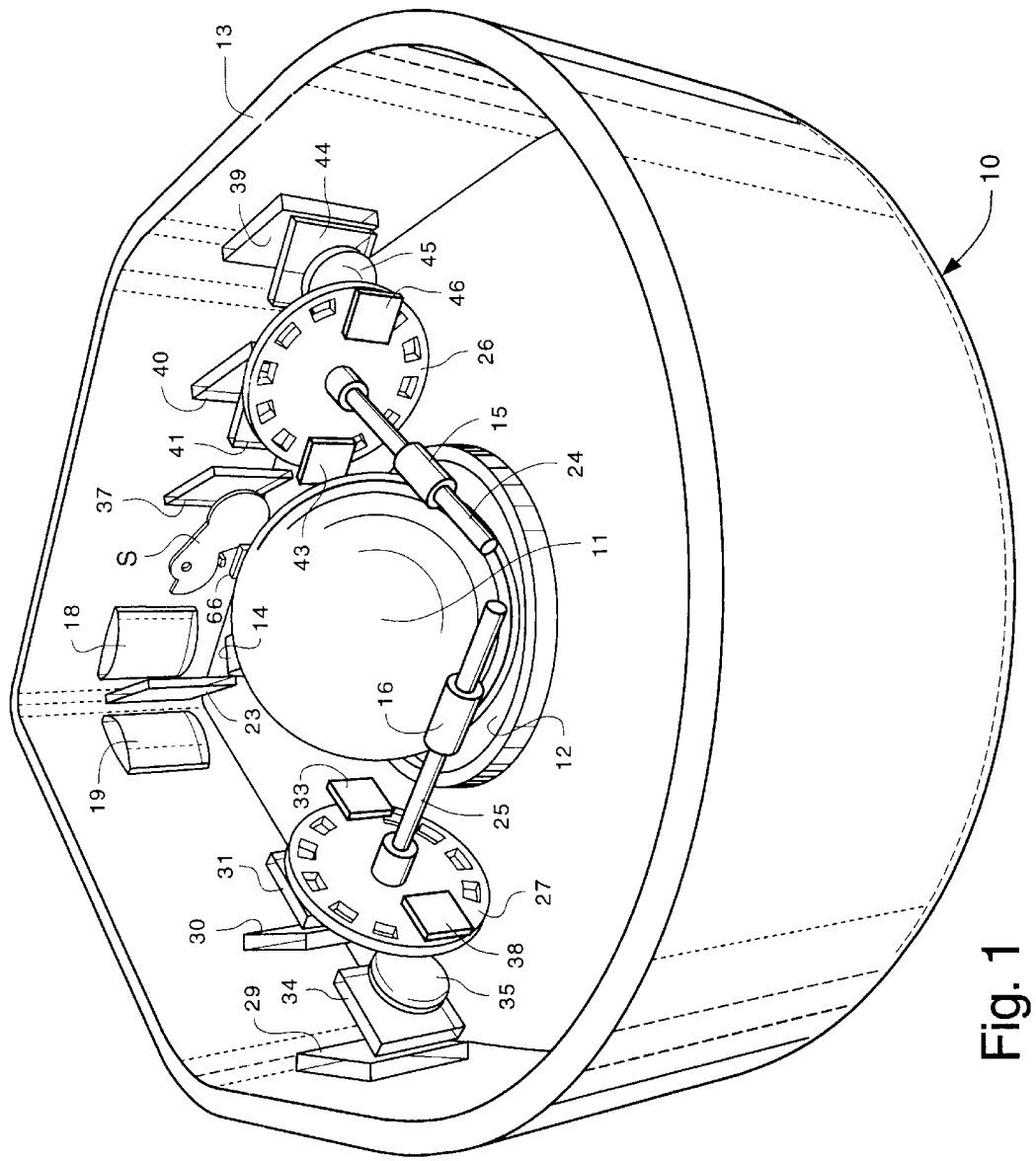
FIG. 1 is a perspective view of a mouse of this invention with the cover removed showing the mouse ball, its race and the pair of light chopper wheels constituting optical shutters and one form of retroreflective optics contained within the mouse.
Figure 2:
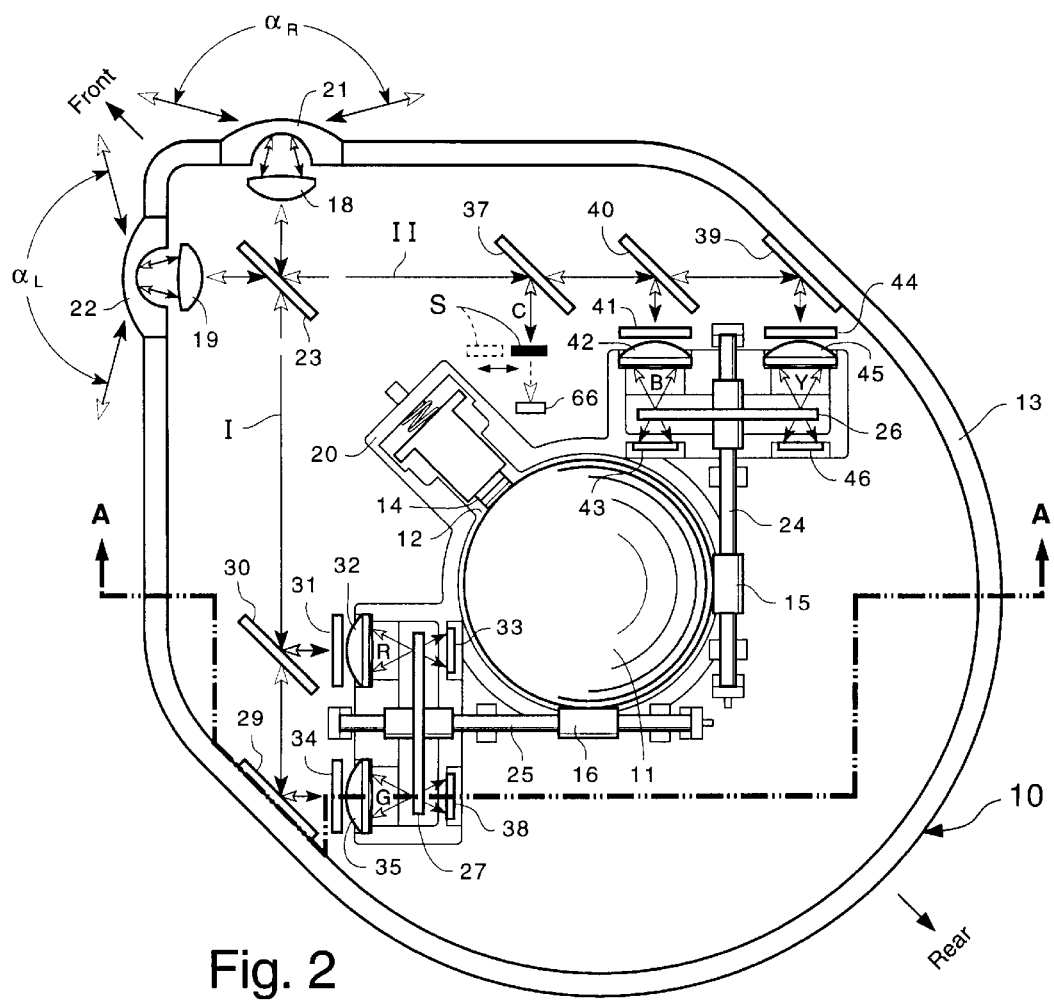
FIG. 2 is a top plan view of the mouse of FIG. 1 with the cover removed and the mechanical and optical elements of a mouse shown along with light paths indicated.
Figure 3:
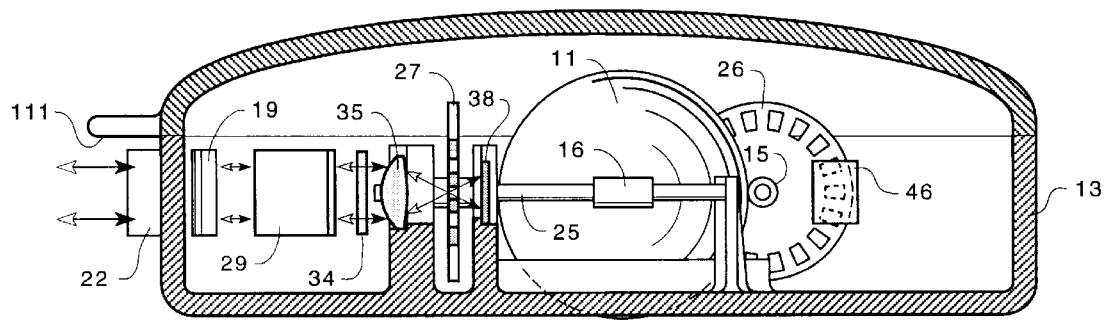
FIG. 3 is a vertical sectional view of the mouse of FIG. 2 taken along line A—A of FIG. 2 with the added feature of an eyebrow for minimizing ambient light interference.

Now referring to FIGS. 1–3 showing a primary form of the mouse of this invention, generally designated 10. It may have the same general shape and size of many conventional electronically cabled mice, being approximately two and one half by four inches and approximately one inch high so as to be conveniently held in the palm of the hand while being moved. The cover of the mouse 10 has been removed in FIGS. 1 and 2 to show the mechanical and optical elements of the mouse 10.

Most prominent in the interior of the mouse 10 is a conventional smooth rubber ball 11 resting in a partial spherical recess or race 12 with the surface of the ball 11 exposed on the underside of the base of the housing 13 to engage the support surface below, such as a mouse pad. The opening in the base of the mouse is unshown in the drawing but is well know in the art. The ball 11 is restrained in the recess 12 by three rollers 14, 15 and 16. The roller 14 which is only partially shown in FIG. 1 but which appears in FIG. 2 is journaled in an upstanding bracket 20 which is secured to the base and generally located toward the front of the housing 13. The roller 14 provides a spring-loaded force for ball 11 to maintain mechanical engagements of rollers 15 and 16 using friction.

The rollers 15 and 16 are each increased-diameter portions of respective shafts 24 and 25 which have axes which are at right angles to each other, and at 45° angles with respect to the mouse housing 10 as shown in FIG. 2. The rollers 15 and 16 each rotate optical chopper wheels in the mouse which serve as light modulating means.

In the embodiment of FIGS. 1–3, incident light, which is employed in detecting mouse 10 movement, may enter through either lens combination 21 and 18, and/or 22 and 19, constituting optical windows in the housing 13 as best seen in FIG. 2. These sets of lens combinations define the angles of acceptance to which the mouse may respond to optical signals and appearing in FIG. 2 as limited by the double ended arrows. Radiation entering through either lens 21 or 22, traverses the following paths:

Light Path I a. It is split by beamsplitting mirror 23 into two beams, one in each of the light paths I and II of FIG. 2. The function of 50/50 white-light beamsplitter 23 is to combine received light, into a common optical path I, regardless of the optical window 21 or 22 or the receiving lens 18 or 19 from which it is received;

b. The beam in light path I is separated into its red component which is reflected at 90° toward a light chopper wheel 27 by 45° oriented dichroic beamsplitter 30 while the remaining spectrum continues through dichroic beamsplitter 30 to be reflected 90° by a 45° oriented front-surface mirror 29;

c. The red beam is reflected 90° by dichroic beamsplitter 30 passes through a red narrow bandpass filter 31, positive spherical lens 32, any available opening in chopper wheel 27 in its light path to be reflected by retroreflector 33, back through the same opening in chopper wheel 27, positive lens 32, bandpass filter 31, is reflected at 90° back into path I by a 45° oriented dichroic beamsplitter 30, partially reflected and partially transmitted by 50/50 beamsplitter 23, and radiates out both negative lenses 21 and 22 to the computer for detection; and d. The incoming beam in path I, less its red component, passes through dichroic beamsplitter 30 to be reflected 90° by 45° oriented front-surface mirror 29, through a green narrow bandpass filter 34, positive spherical lens 35, any available opening chopper wheel 27 in its path to be reflected by retroreflector 38 through its return path to 50/50 beamsplitter 23 and out both lenses 21 and 22.

Any movement of ball 11 which rotates shaft 25 produces a series of pulses of red and green light in path I and emanating out of both lenses 21 and 22 for detection by the associated computer receiver.

Light Path II a. MOUSE BUTTON CONTROL

The beam in path II is separated spectrally by reflecting its cyan component 90° by a 45° dichroic beamsplitter 37 toward a shutter S and a retroreflector 66 to create a momentary retroreflecting mouse-button control signal whenever the shutter S is open as is described below in connection with FIG. 7;

Each operation of shutter S produces a single pulse of cyan light out of lenses 21 and 22;

b. The remaining wavelength components of the beam in path II continue, the blue component being reflected at 90° toward chopper wheel 26 by 45° dichroic beamsplitter 40 while the remaining spectrum continues until it intercepts a 45° oriented front-surface mirror 39;

c. The blue beam from the blue reflecting dichroic beamsplitter 40 passes through a blue bandpass filter 41, positive spherical lens 42, through any available opening in chopper wheel 26 in its light path to be reflected by retroreflector 43, then back through the same opening in chopper wheel 26, positive lens 42, bandpass filter 41, and is reflected back into path II by dichroic beamsplitter 40, partially transmitted and reflected by 50/50 beamsplitter mirror 23, and out both negative cylindrical lenses 21 and 22 as flat fan-shaped broad-spectrum beams for detection by the computer's photodetector; and d. The incoming beam II, less its cyan and blue components, passes through dichroic beamsplitter 40 to be reflected 90° by 45° oriented mirror 39, through a yellow band pass filter 44, positive lens 45, any available opening chopper wheel 26 in its path, to be reflected by retroreflector 46 through its return path to mirror 39 and out both lenses 21 and 22 in flat fan-shaped beams to be separated and detected in the computer.

Any movement of ball 11 which rotates shaft 24 produces a series of pulses of blue and yellow light emanating out of both lenses 21 and 22 for detection by the computer or its mouse controller.

The chopper wheels 26 and 27 rotate in response to the movement of the mouse and rotation of the ball 11, and the resultant pulses of modulated light from each chopper wheel is translated in the computer into control signals for screen cursor movement or other computer actions. These chopper wheels or perforated discs act as a pair of optical shutters for the system.

Figure 18A:
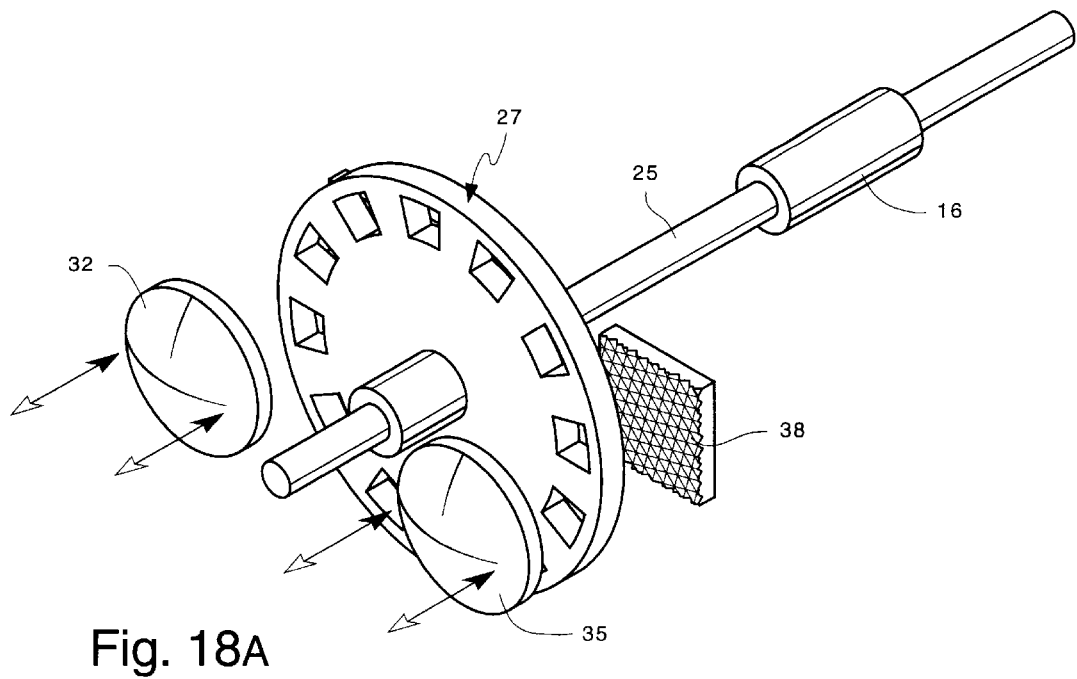
FIG. 18A is a simplified perspective view of the preferred embodiment of the light chopper wheel employed in the foregoing embodiments of this invention.
Figure 18B:
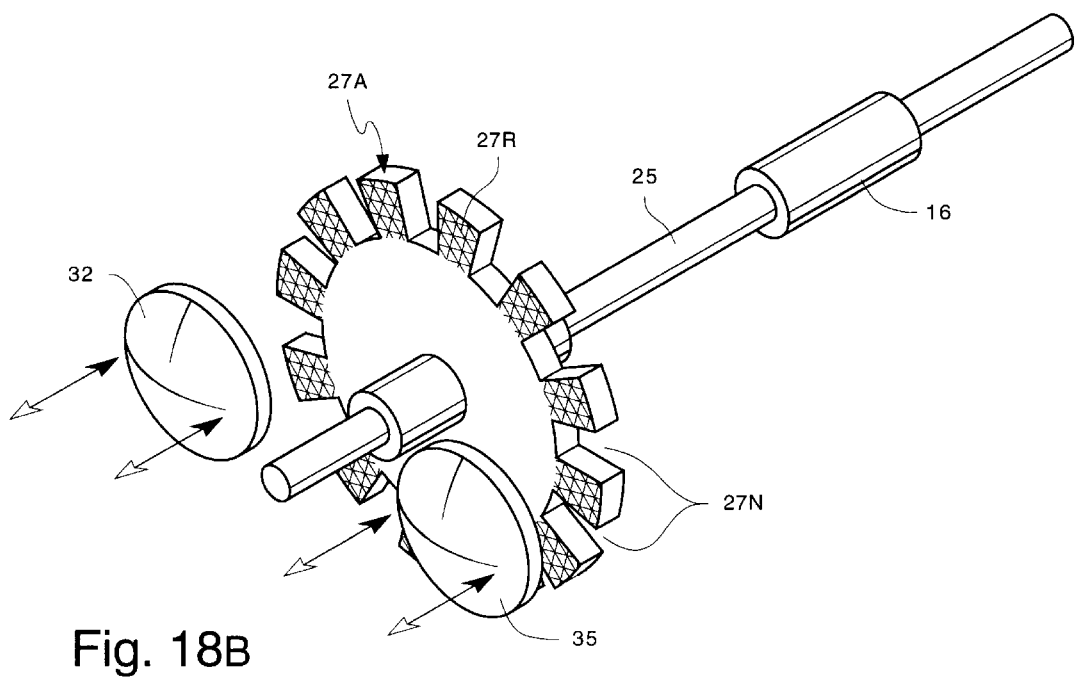
FIG. 18B is a simplified perspective view of an alternate form of light chopper wheel incorporating retroreflective material on certain sections of its near surface for reflection and eliminating the retroreflectors behind the light chopper.

For an additional view of the preferred embodiment chopper wheel 27, reference should be made to FIG. 18A while an alternate form of chopper wheel 27A may be seen in FIG. 18B.

Lens combinations 19 and 22, and 18 and 21, are preferably of the cylindrical wide-angle type defining optical windows in the housing 13 designed to receive radiation arriving within a flat fan-shaped region parallel to the horizontal plane of the work surface of the mouse 10. Further, cylindrical lenses create a linear or line image, the optical equivalent of a slit of light, which is required for the diffraction grating mice shown in FIGS. 4 and 6, and prism mouse shown in FIG. 5, and in computer bases of FIGS. 15 and 16, as described below.

Figure 9:
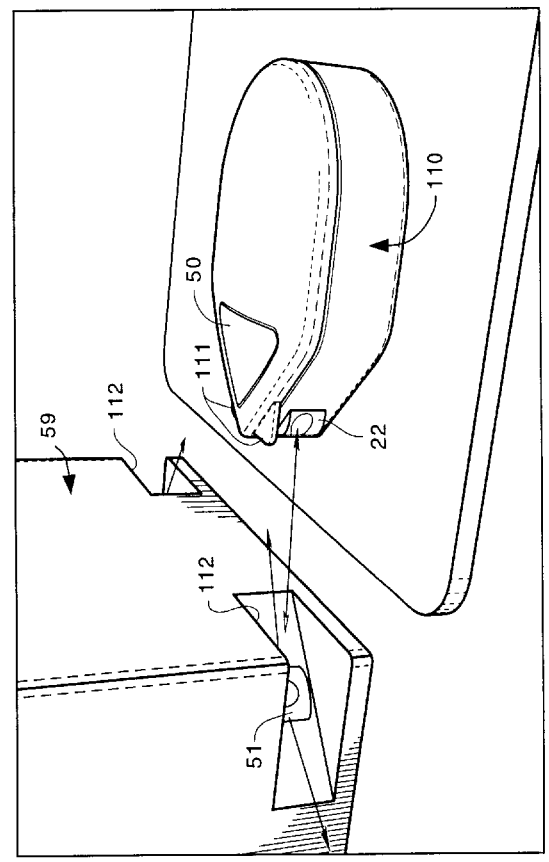
FIG. 9 is a perspective pictorial representation of a computer base with corner-positioned lenses used to accommodate the mouse of this invention at the left and right front side thereof and shown with a mouse of this invention on a mouse pad.

In the computers, as illustrated in FIGS. 9 and 12, the sendreceive windows should preferably be at the same height as the mouse so that no significant vertical spread of light is required by the computer or optical mouse for communication.

The mechanical components of the mouse 10, i.e., the chopper wheels 26 and 27, have been oriented at a 45° angle relative to the longitudinal axis, with respect to conventional mice, to provide equally good optical communication for both left and right-handed people.

From an examination of FIG. 2, it is apparent that a forward or reverse movement in the directions of the front or rear arrows will produce rotation of ball 11 in a forward or reverse direction but produces movement of both rollers 15 and 16 producing digital optical signals. Sideways movement of the mouse 10 in either direction left or right in FIG. 2 likewise produces movement of both rollers 15 and 16, and any intermediate direction of movement of the ball 11 produces a unique combination of optical pulses representative of the direction and extent of displacement of the ball from its previous position. The optical pulses are detected in the computer housings indicated in FIGS. 9 and 12–16 and well known quadrature signal processing is used to move a cursor on the screen of a monitor or to perform other computer control tasks.

It should be noted in FIG. 2 that the interior of the mouse housing 13 is devoid of conventional operational devices such as integrated circuits or printed circuit board and there are no batteries, cables or electrical connectors. In fact, the only elements present are the moving ball, chopper wheels, and the associated optical elements. Therefore, this constitutes an opto/mechanical mouse. The design and layout of the optical components makes it an optically retroreflective mouse and its associated computer, an optically retroreflective controlled computer.

Figure 7:
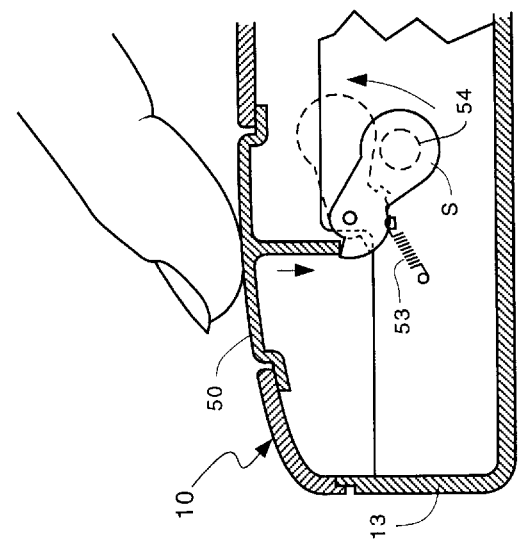
FIG. 7 in is a fragmentary vertical sectional view through a mouse housing illustrating the construction and operation of the mouse button for briefly allowing transmission and retroreflection of light to indicate a mouse button click operation.

The only other elements present in the mouse housing 13 may be one or more control buttons such as the button 50 of FIG. 7, shown just before operation by the user's finger to depress shutter blade S which moves against the resistance of a return spring 53 to open an aperture 54 to retroreflect a unique optical signal through aperture 54 which is shown as a dashed line behind the shutter blade S. The button assembly is best seen in FIGS. 7, 9 and 12.

The green, red, blue, and yellow beams in paths I and II are not interrupted by the shutter S, only the specific (i.e., fifth) color, e.g., cyan in the embodiment of FIGS. 1–3, assigned to that shutter, or in the case of multiple buttons to those specific assigned colors and the shutters which are located in the light paths of the respective colors only.

FIG. 3 shows a mouse 10 with its eyebrow shielding cover in place and illustrates the vertical layout of the components of mouse 10.

Reflection Diffraction Grafting Embodiment

Figure 4:
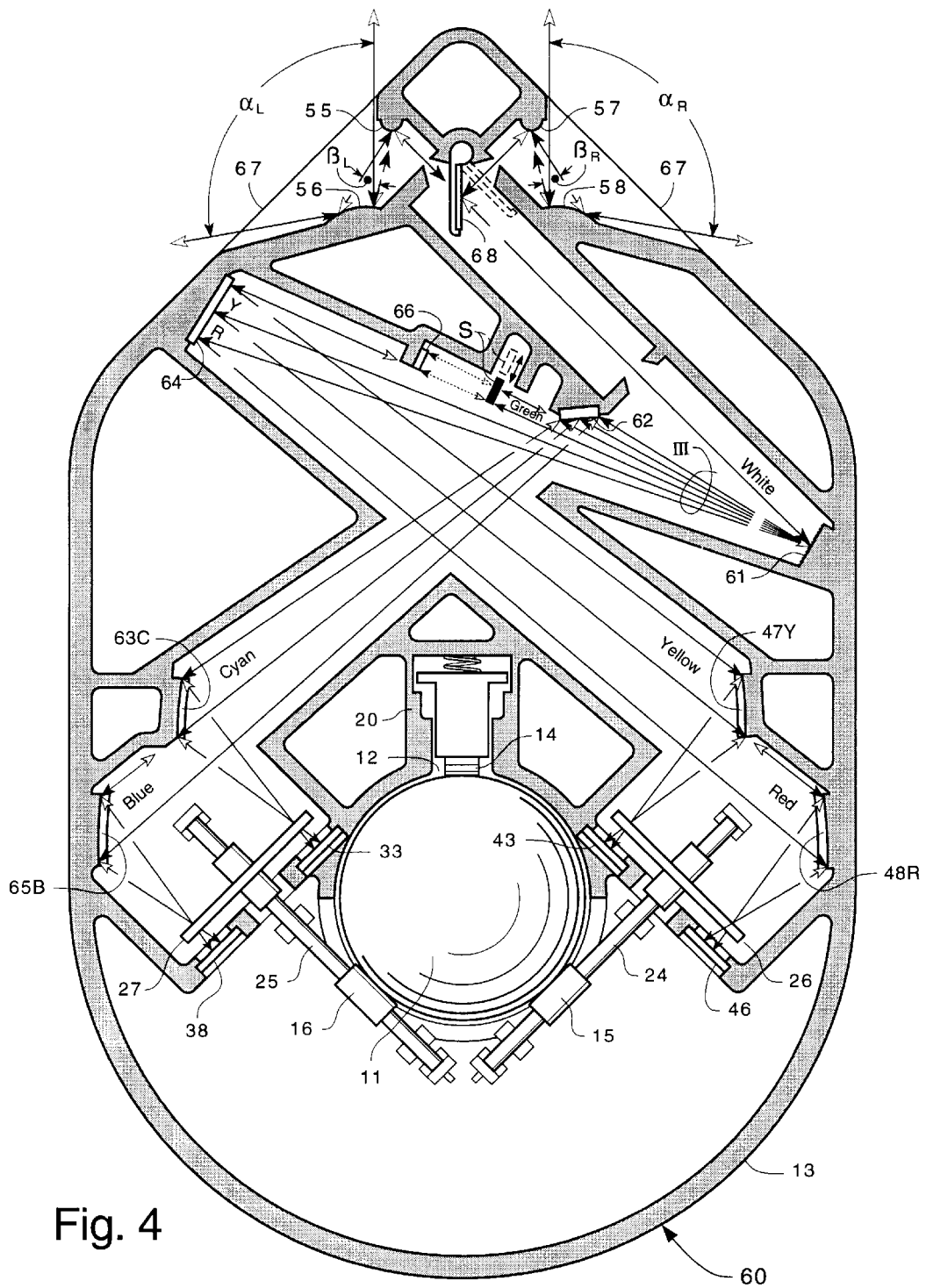
FIG. 4 is a top plan view of an alternate form of mouse of this invention employing a reflective diffraction grating in the mouse optics.

Now referring to FIG. 4, another embodiment of this invention involves a different form of spectrum multiplexing for encoding radiation which will be returned to the computer. This, as other embodiments, is designed to operate with energy received from an incandescent lamp or other broad-spectrum source which provides at least five separable and identifiable spectral bands of radiant energy. This mouse 60 uses many of the same components as the embodiment of FIGS. 1 and 3 and in the case that the same element or component is used in the same manner and is located in the same or comparable location in the optical system, it is given the same reference numeral.

The mouse body 60 contains the same rubber ball 11 in recess or ring 12 and is supported and restrained by three rollers 14, 15 and 16.

Each of the elements described below of the embodiment of FIG. 4 produce retroreflected modulated light pulses which correspond to ball 11 movement just as in the embodiment of FIGS. 1–3. However, the optics of the mouse of FIG. 4 are significantly different than those in FIGS. 1–3, in that no refractive optical elements (such as cylindrical lenses 18, 19, 21 and 22, 50/50 beamsplitter 23, dichroic beamsplitters 30, 37 and 40, narrow bandpass filters 31, 34, 37 and 40, and spherical lenses 31, 34, 42 and 45, all shown in the embodiment of FIGS. 1–3) are used thereby eliminating first and second-surface reflections which create optical noise at the detector section of the computer. Of particular note is the elimination of wide-angle send-receive lens pairs 19 and 22, and 18 and 22 of FIG. 2, and therefore their specular reflections. In their places are wide-angle cylindrical reflective optics, used in pairs, off axis, and individually and collectively having the effect of narrowing the angle of incoming light, from over a wide fan-shaped area into a virtual zero-angle collimated pencil beam directed at the diffraction grating 61.

Swing-out first-surface mirror 68 is located in the white-light optical path and is operated by a rotational lever, not shown, accessible from the bottom of the mouse, which allows the user to position the mirror out of the white-light path for right-hand operation, or in the path for left-hand operation. This fully-reflective mirror 68 has the advantage over 50/50 beamsplitter 23 in FIGS. 1, 2, 5, 6, and 10 of not attenuating, the light signal between the computer and mouse. Further, it reduces ambient light in the mouse by favoring the side of the mouse from which the signal from the computer will be received, and by fully blocking the light from the unused side.

The send-receive optics are symmetrical with respect to the longitudinal axis of the mouse, therefore description of the optics of one side will serve to explain both sides. As example, light which is received by the mouse from the left side can be received within the wide fan angle $\alpha_L$. This light impinges and reflects from cylindrically-convexed mirror 56 at a significantly reduced angle of $\beta_L$ which reflects from a second cylindrically-convexed mirror 55 which forms an image which is uncompressed vertically (perpendicular to the drawing) but which is greatly reduced horizontally, forming essentially a vertical line image, which reflects into the mouse toward diffraction grating 61, provided the mirror 68 is moved to its dashed-line position.

Once the light reflects off of cylindrical mirror 55, the already reduced fan angle $\beta_L$ is further reduced to virtually a zero angle shown as a single optical path identified as "White" near the diffraction grating 61. Cylindrical mirror 55 is of a size and position so as to block direct outside light from being transmitted directly in the mouse housing to the diffraction grating 61. This vertical line image, created by cylindrical mirror 55 is optically equivalent to the slit image required by diffraction grating 61. Circular polarizing filters, covering the send-receive lens at the computer, can be used to minimize direct first-surface reflections from convexed mirrors 56 and 58. The reflective optics, 55–58 can be molded integrally into the mouse housing 13 and flashed with aluminum to increase reflectivity. Elements 55–58 are sufficiently recessed within the outer edges of the mouse exterior so as to create effective eyebrows 67 to reduce interference from ambient illumination, and to protect the optics 55 and 56 from abrasion.

The diffraction grating 61 reflects and spreads the white light received over the flat fan-shaped path III into at least five distinguishable colors, in this case identified as the blue, cyan, green, yellow, and red wavelengths of the light spectrum. Mirror 62 is positioned and secured to the base of the mouse housing 60 to intercept and reflect the blue and cyan components. The cyan component is reflected by off-axis parabolic mirror 63C for reflection by retroreflector 33 with the passage of cyan light through an opening in light chopper wheel 27.

The blue component also is reflected by mirror 62 to be intercepted by off-axis parabolic mirror 65B for similar retroreflection, as is encountered by the cyan component.

The yellow and red components of the white or broad-spectrum light reaching diffraction grating 61 are spread by grating 61 to unique angles so that they do not intercept mirror 62. Both the yellow and red components continue until they intercept front surface mirror 64 which reflects yellow light to off-axis parabolic mirror 47Y which reflects and focuses the yellow component Y through any available opening in the chopper wheel 26 assembly for reflection by retroreflector 43. The red component is reflected by front-surface mirror 64 to off-axis parabolic mirror 48R to the chopper wheel 26 for reflection by retroreflector 46. The red component is reflected and focused by off-axis parabolic mirror 48R through any available opening in chopper wheel 26 for retroreflection back to off-axis parabolic mirror 48R, nearly coincident with the retroreflection of the yellow component.

Of course, compound movement of the ball will produce retroreflected pulses in all four paths for blue, cyan, yellow and red colors back to reflection diffraction grating 61 which combines it into a single beam of "white" light.

The green component of the incoming broad-spectrum "white" light beam, reflected and separated by diffraction grating 61, does not intercept either mirror 62 or 64 but instead normally intercepts and is blocked by mouse-button shutter S. Whenever the mouse button 50 of FIGS. 7, 9 and 12 is depressed, an opening or light path as indicated in FIG. 4 by the dotted lines is opened, the green beam G continues until it intercepts and is reflected by retroreflector 66 whenever the mouse button 50 is depressed.

Prism Embodiment

Figure 5:
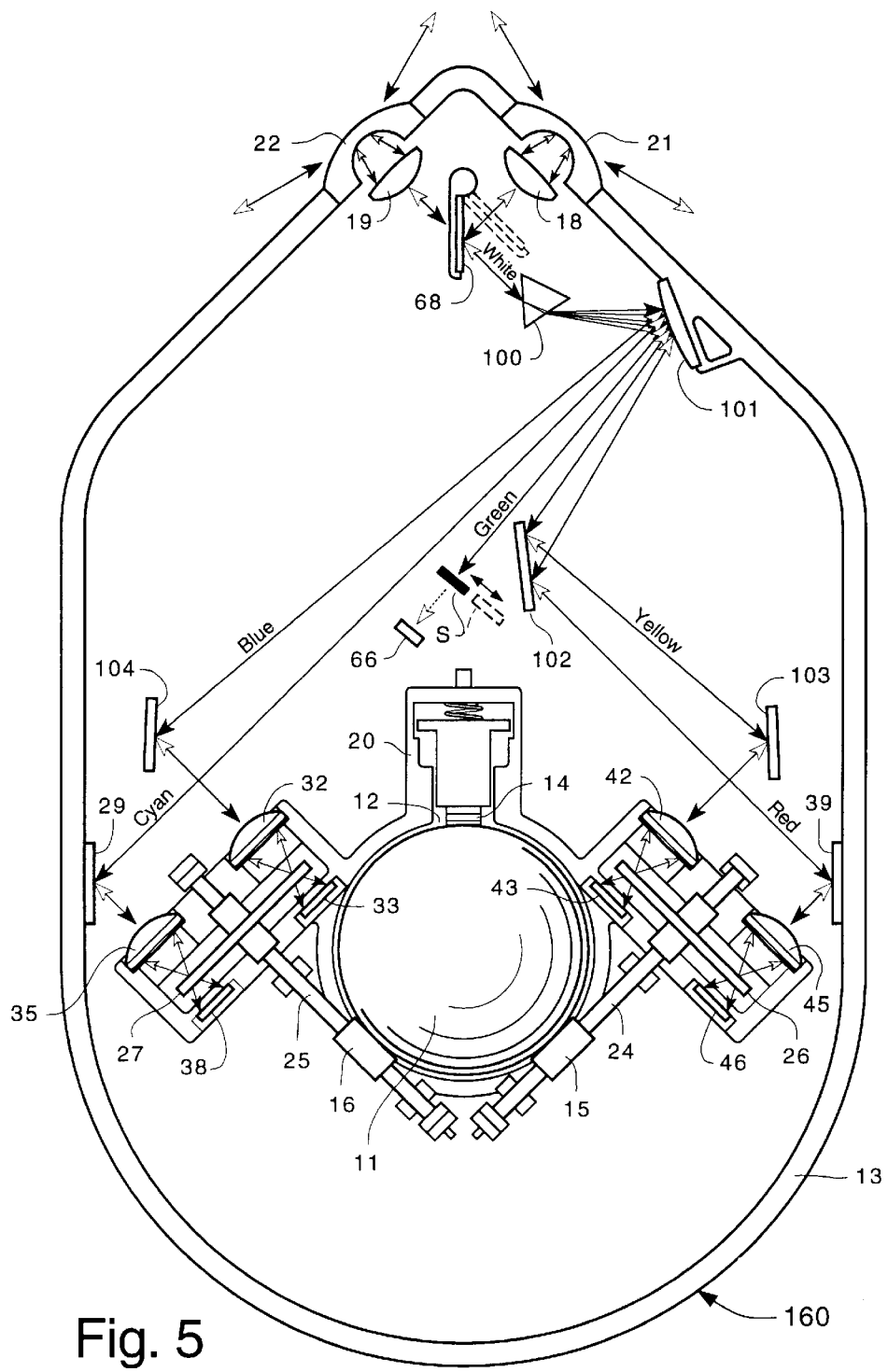
FIG. 5 is a top plan view of another form of mouse of this invention employing a prism and a cylindrical wide-angle mirror in the mouse optics.

This invention may also be implemented by employing a classic triangular prism to create a color spectrum from white light. This prism approach is illustrated in FIG. 5 which shows broad-spectrum light entering at either wide-angle lens 22 and 19, or 21 and 18. In the case of light entering through lens combination 22 and 19, the broad-spectrum light impinges on triangular prism 100.

In the case of broad-spectrum, e.g., white, light which enters through lens combination 21 and 18, the light reflects off of first-surface mirror 68 and is reflected toward prism 100, and to direct it toward the triangular prism 100. Triangular prism 100, typically made of flint glass, refracts each wavelength (color) at a slightly different angle and directs it to cylindrically-convexed mirror 101. Convexed mirror 101 reflects the light and, because of its curvature in one direction, expands the angular spread of colors into a flat fan-shaped beam so that the colors may be more easily separated in the mouse 160. Mirrors and other optics are arranged in the mouse 160 to intercept the various colors of light and to direct specific colors to specific retroreflectors. In all cases, the light beams can be interrupted by various shutters or choppers.

The blue beam is intercepted by front-surface mirror 104 which reflects predominantly blue light through blue spectrum passing filter 41 and spherical lens 32 which focuses the blue light to the surface of the holes on chopper wheel 27. When a hole in the chopper wheel 27 aligns with the blue light beam it passes through the hole and impinges on sheet retroreflector 33 which returns the light through the same hole in the chopper wheel 27, through collimating lens 32, through blue spectrum passing filter 41, reflects off of mirror 104, then off of cylindrical mirror 101, where it is reflected to prism 100 where it is refracted at a slight angle. This blue energy is transmitted through lenses 19 and 22, or lenses 18 and 21 depending on the position of the dual positionable first-surface mirror 68.

The predominantly cyan beam from the cylindrical mirror 101 is intercepted by front-surface mirror 29 which reflects the cyan light through spherical lens 35 which focuses the cyan light to the surface of the holes on chopper wheel 27. When a hole in the chopper wheel 27 aligns with the cyan light beam, it passes through the hole and impinges on sheet retroreflector 38 which returns the light through the same hole in the chopper wheel 27, through collimating lens 35, reflects off of mirror 29, then to cylindrical mirror 101, to follow the path described above for the blue beam to the windows formed by lenses 19 and 22, or 18 and 21.

The path of the green beam is intercepted by the shutter blade S which is operated by mouse button 50, shown in FIGS. 7, 9 and 12. Shutter S is normally closed, i.e., light-blocking. When the mouse button 50 is actuated, shutter S moves to its non light-blocking position, and allows the green light to impinge on retroreflector 66 which returns the light to cylindrical mirror 101, to follow the return path described above. Release of the mouse button 50 allows the shutter S to return to its light-blocking position.

The predominantly yellow beam from cylindrical mirror 101 is intercepted by front-surface mirror 102 which reflects the light to front-surface mirror 103 which reflects the light through spherical lens 42 which focuses the yellow light to the surface of the holes on chopper wheel 26. When a hole in chopper wheel 26 aligns with the yellow light beam, the yellow beam passes through the hole and impinges on sheet retroreflector 43 which returns the light through the same hole in the chopper wheel 26, through collimating lens 42, reflects off of mirrors 103 and 102, then to cylindrical mirror 101, to follow the return path described above for the blue, cyan, and green beams.

The predominantly red beam from cylindrical lens 101 is intercepted by front-surface mirror 102 which reflects the red light to front-surface mirror 39 which reflects the light through spherical lens 45 which focuses the red light to the surface of the holes on chopper wheel 26. When a hole aligns in chopper wheel 26 with the red light beam, it passes through the hole and impinges sheet retroreflector 46 which returns the light through the same hole in the chopper wheel 26, through collimating lens 45, reflects off of mirrors 39 and 102, then to cylindrical mirror 101, to follow the return path described above for each of the other blue, cyan, green and yellow beams.

Transmission Diffraction Grating Embodiment

Figure 6:
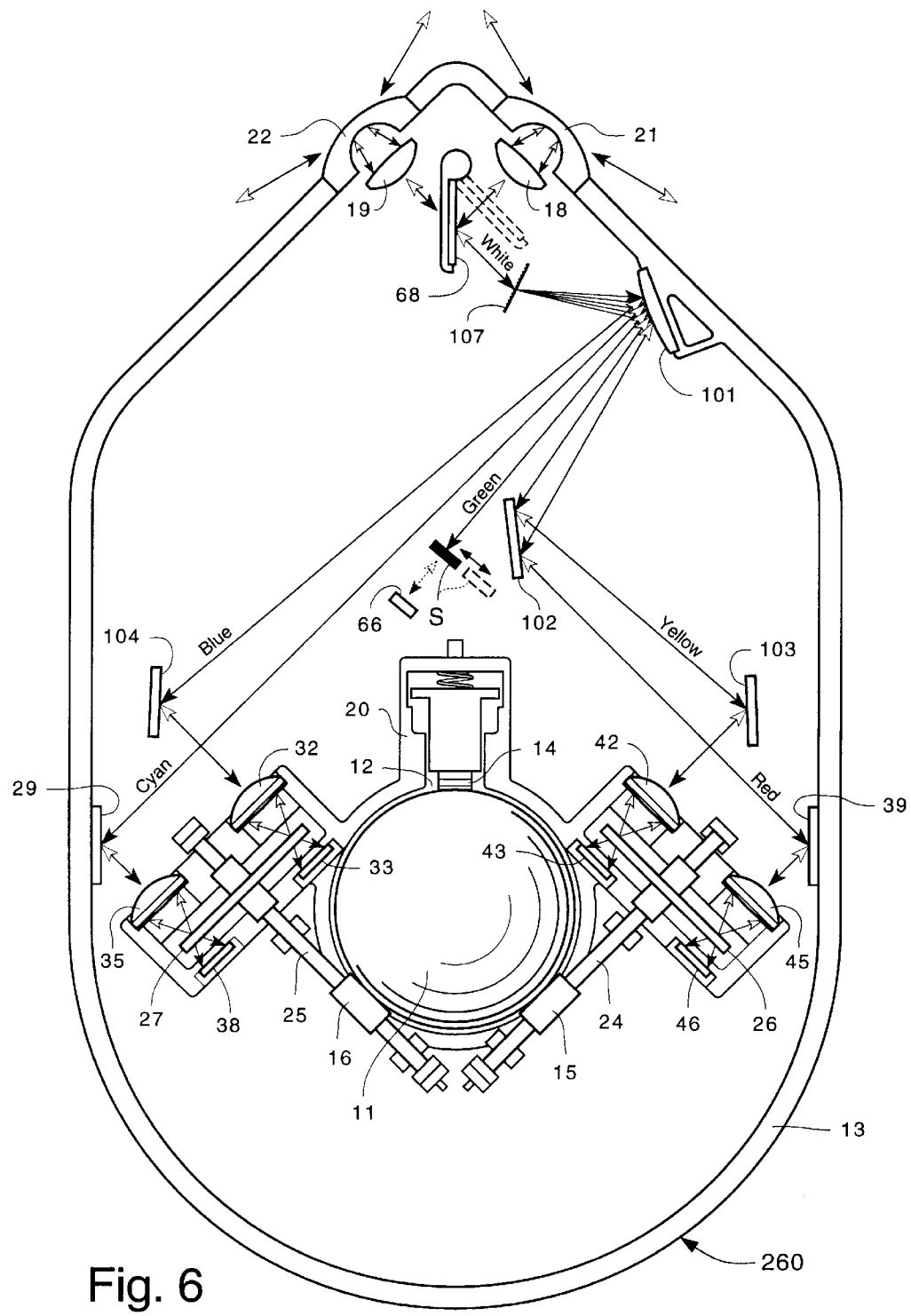
FIG. 6 is a top plan view of another form of mouse of this invention showing the use of a transmission diffraction grating and cylindrically curved wide-angle mirror in the mouse optics.

This invention may also be implemented by employing a transmission diffraction grating. This approach is illustrated in FIG. 6 which shows broad-spectrum light entering at either wide-angle lenses 22 and 19, or 21 and 18. In the case of light entering through lens combination 22 and 19, the light directly impinges on the transmission diffraction grating 107.

In the case of broad-spectrum light which enters through lens combination 21 and 18, the light reflects off of 45° first-surface mirror 68 in the direction the diffraction grating 107. The function of mirror 68 is to allow the user to configure the mouse for right or left-handed operation to direct light, regardless of from which input lens it received radiation, to diffraction grating 107. Broad-spectrum light which is incident on diffraction grating 107 is diffracted at slightly different angles, varying according to wavelength and color. Each color impinges on cylindrically convexed mirror 101. Convexed mirror 101 reflects the light and, because of its curvature in one direction, expands the angular spread of colors of the flat fan-shaped beam so that the colors may be more easily separated in the mouse 260. Mirrors and other optics are arranged in the mouse to intercept the various colors of light and to direct specific colors to specific retroreflectors.

In all cases the light beams can be interrupted by various shutters or choppers. The optical paths of the light, after it passes through from this transmission diffraction-grating 107, are identical to those of the corresponding colors, prismatic color separation mouse 160 of FIG. 5 described above.

Button Control

FIG. 7 is a fragmentary vertical sectional view through a mouse 10 of this invention and shows a computer user's finger about to depress mouse button 50 to open the optical path beyond shutter blade S which will allow the passage of light of a specific color, for example green, through aperture 54 shown in FIG. 7 as a dashed line behind in shutter S. Light which passes through aperture 54 impinges on retroreflector 66, shown in FIGS. 1–2, 4–6 and 10, which returns that specific color back through aperture 54 for return to the computer for detection. If more than one mouse button is needed, the same technique is used with other discrete colors, and the shutter mechanism is duplicated.

Figure 8:
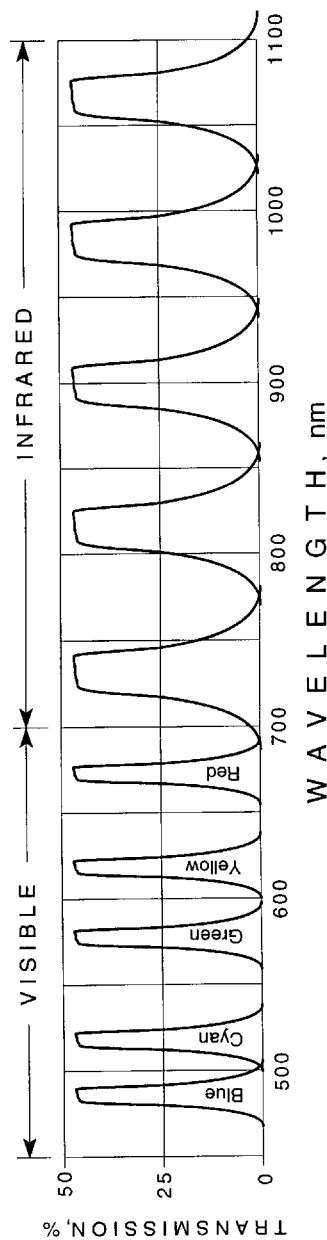
FIG. 8 is a spectral graph illustrating five visible spectral bands used to describe this invention, and five bands which could be used in the non-visible infrared region.

FIG. 8 is a graph of the spectrum of light particularly usable by the mice and computers of this invention indicating the positions of example blue, cyan, green, yellow and red wavelengths, used to describe the invention, within the visible portion of the spectrum, as well as showing the infrared portion indicating five alternate non-visible narrow-band IR wavelengths. It is not important that the specific wavelengths and colors shown in FIG. 8 be used in the mouse, but that the colors be relatively narrow band and monochromatic so that their colors do not overlap spectrally, so that each color can be detected independently. For purposes of description of this invention, white light is used because familiar terms exist for visible colors which make up white light. As stated herein, in the final product it may be desirable from an appearance point of view to use spectral energy which is not visible to the user, for example in the infrared portion of the spectrum. FIG. 8 shows five discrete wavelengths in the visible range and five in the infrared range.

FIG. 9 is a perspective pictorial diagram showing a mouse 110 of this invention, and the base of a computer 59, both with wide-angle send-receive lenses 22 of the mouse, and 51 of the computer housing 59. Mouse 110 also indicates mouse button 50 and a pair of eyebrows 111 which are used to baffle ambient light. Further, similar eyebrows 112 are indicated on both sides of the base of the computer housing 59 to shield wide-angle send-receive lenses 51 and 52 (the latter not shown) from ambient light.

Dual Level Path Embodiment

FIG. 10 a top plan view of a mouse 120 with the cover removed, and FIG. 11, a vertical sectional view, are of a mouse of this invention showing offset entrance and return optical paths. The purpose of this approach is to try to minimize front and back-surface reflections from optical elements such as the lenses and colored filters, which may reflect light (optical noise) back to the computer, making it harder for the computer to detect the signals from the mouse.

A typical light path can be traced by following it in FIGS. 10 and 11 as follows:

a. light enters the mouse on the lower level, through wide-angle lens combination 22L and 19L. Approximately half of the light is reflected by double height 50/50 beamsplitter 23 along leg I of FIG. 10 through double-height dichroic beamsplitter 30 to front-surface mirror 29 which reflects the light through green-transmitting filter 34, through lens 35 which focuses the light onto the holes in chopper wheel 27. If a hole in chopper wheel 27 aligns with the green light path, the green light emerges and is collimated by lens 73G and is reflected 90° upward by 45° oriented front-surface mirror 74G to a second 45° oriented front-surface mirror 75G which reflects the green light 90° back over the entrance path, to a 45° oriented front-surface mirror 29T, through double-height dichroic beamsplitter 30, to 50/50 beamsplitter 23 which reflects the light through wide-angle exit lens combination 19T and 22T.

Approximately half of the light which reaches 50/50 beamsplitter 23T is transmitted through wide-angle exit lens combination 18T and 21T.

FIG. 12 is a perspective pictorial diagram showing the offset retroreflective mouse 120 of this invention with separate wide-angle receive lens 22L and send lens 22T, and the base of a similar computer 59, with separate wide-angle send lens 51L and receive lens 51T. Mouse 120 also includes a mouse button 50 and eyebrows 111 which are used to baffle the lenses 21T, 21L (not shown) and 22T and 22L from cross contamination and ambient light. Further, similar eyebrows 112 are indicated on the side of the base of the computer 59 to baffle the lenses from cross contamination and ambient light.

In FIGS. 10–12, the incident and reflected optical energy paths are not coincident or identical but slightly displaced or offset vertically. They are, however, retroreflective in that regardless of the position of the mouse within the optical field of the computer, reflected signals return to their origin, i.e., the computer source and at least lateral coincidence exists.

Computer Optical System

FIG. 13 is a fragmentary sectional view through the base of the computer 163 indicating three general optical sections of this invention, an emitter section E, a detector section D and a light beam path section B. The wide-angle send-receive lenses 51 and 52, associated mirrors and beamsplitter 49 are located in the beam path section B at the bottom of FIG. 13. The emitter portion E is located at upper left, and detector portion D at upper center. In sequence of events, in the emitter section E, light of five spectrally different colors is emitted, one color each, by five light-emitting diodes (LED's) 122a–e. The light is combined into a common optical path by four dichroic beamsplitters 105a–d, chosen on the basis of efficiency to reflect the appropriate color, and transmit remaining colors.

Once the colors are combined, the broad-spectrum, e.g., white, light is reflected by front-surface mirror 106 and approximately half is reflected by 50/50 white-light beamsplitter 49 through wide-angle lens combination 52P and 52 to the associated mouse. Of the remaining broad-spectrum light which reaches 50/50 beamsplitter 49 approximately half is transmitted to reflect from front-surface mirrors 108 and 109 to emerge through wide angle lens combination 51P and 51 to the same mouse.

Return light, as indicated in each of the figures by open arrowheads, is received at the mouse at either or both wide-angle lenses 51 or 52, reflects its way through the light path portion B of the computer base, some light being reflected and/or partially transmitted by 50/50 beamsplitter 49 to be reflected by mirror 121 into the detector portion D.

At this stage, the combined colors from the mouse are separated by being reflected and transmitted by dichroic beamsplitters 105a–d, which each reflect a specific wavelength and transmit the remaining wavelengths through narrow bandpass filters 113a–e which fine tune by the colors, for example, transmitting red, yellow, green, cyan or blue, to photodetectors 123a–e. If a return signal from the mouse of a specific color is detected the computer reads the flashes of modulated light and converts the light to electrical pulses used to control the cursor movement on the computer screen, as is well known.

FIG. 14 shows the underside of a notebook computer 263 with a cover plate removed which reveals two general sections, the emitter section E, and the detector section D. In this embodiment, flexible fiber optics are used to send light from the LED's 122a–e to optical fiber 136 which is encased in protective vinyl, to the right or left edges of the computer case 263 for illumination of the associated mouse. The emitter portion E is located at upper left, and spectrometer or detector portion D at upper right.

In sequence of events, in the emitter section E, light of five spectrally different colors is emitted, one color each, by five light-emitting diodes (LED's) 122a–e. The LED's 122a–e are preferably arranged in a cluster within the acceptance angle of the optical fiber 136. The light emerges at the far end of the optical fiber 136 so that illumination is directed toward the associated mouse. Any return light received from the mouse at the computer 263 strikes input fiber 138 which feeds the return light to the spectrometer and detectors 123a–e in the computer 263 base.

On entering the spectrometer, the light is reflected and collimated by concave mirror 125 to diffraction grating 132 which breaks up the broad-spectrum light into colors and reflects it at varying angles to cylindrically-convexed mirror 134 which reflects and angularly spreads the colors to photodetectors 123a–e. The optical elements, collimating mirror 125, diffraction grating 132, and convexed mirror 134 preferably are molded as part of the computer, and aluminized to increase the reflectivity, rather than being assembled as separate parts.

Figure 15:
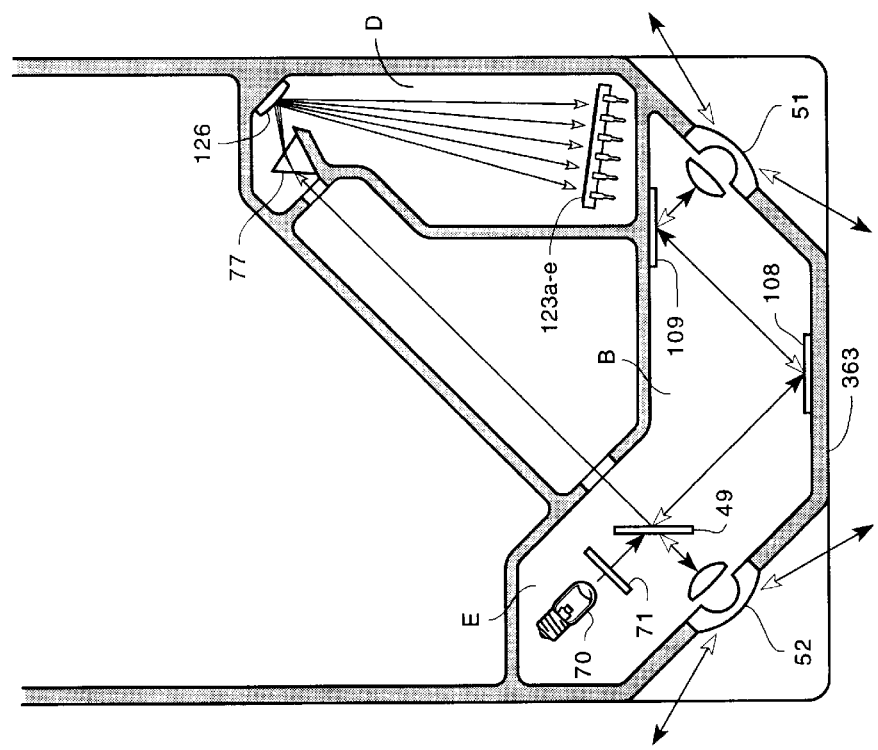
FIG. 15 is a fragmentary transverse sectional view through the base of another computer embodiment in accordance with this invention showing a broad-band incandescent lamp and filter in the emitter portion, and a detector portion containing a wide-angle mirror, prism and linear photodetector.

FIG. 15 is a fragmentary horizontal sectional view through the base of the computer 363 employing an incandescent lamp light source 70, the wide-angle send-receive lenses 51 and 52 and associated mirrors 108 and 109 and beamsplitter 49 in the beam section B, and the prism spectrometer and detector portion D at right.

In sequence of events, the incandescent lamp 70 emits broadband white light. The visible colors can be used or, for appearance sake, an optional filter 71 can be used to block visible colors and allow near infrared to be transmitted out of wide-angle send-receive lenses 51 and 52 which create flat fan-shaped beams of light indicated by the solid arrowheads, which can be intercepted and retroreflected by an associated mouse.

Any return light, indicated by hollow arrowheads, received from the mouse at the computer 363 retraces, in reverse order, the paths where it is reflected by 50/50 beamsplitter 49 if received from lens 51, or transmitted through beamsplitter 49 if received from lens 52, into the spectrometer and detector portion D of the computer base 363. On entering the spectrometer in detector portion D, the broad-spectrum light is refracted by the triangular prism 77 into a spectrum of colors. The colors reflect off of cylindrically-convexed mirror 126 to increase the angular spread of the light to be detected by the discrete photo detectors or linear photodetector array 123a–e.

Figure 16:
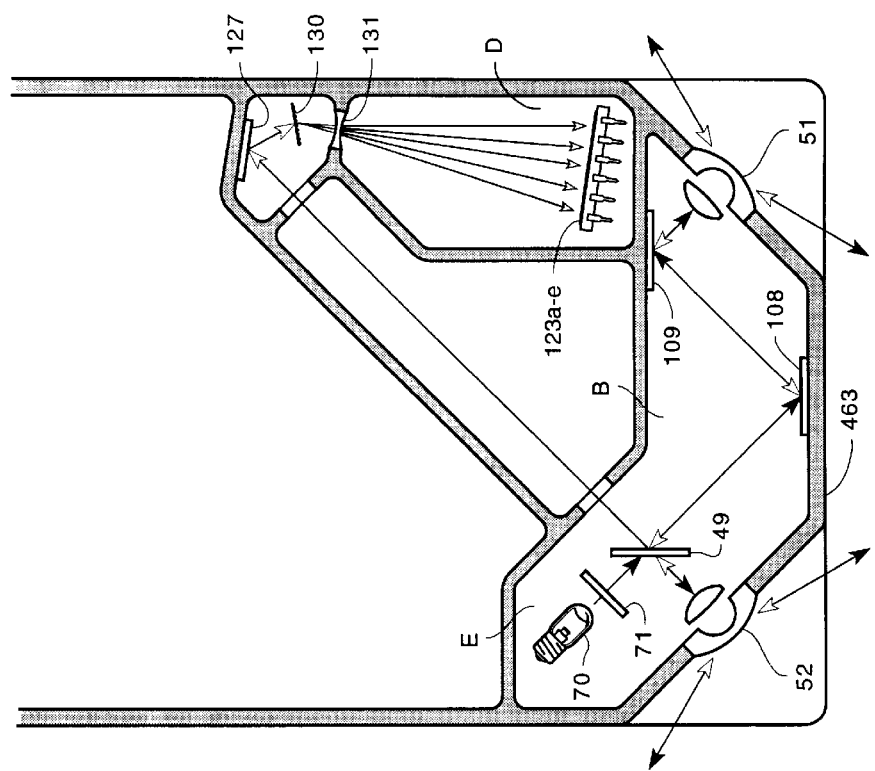
FIG. 16 is a fragmentary transverse sectional view through the base of still another computer embodiment in accordance with this invention showing a broad-spectrum incandescent lamp and filter in the emitter portion, and a transmission diffraction grating, cylindrical wide-angle lens and linear photodetector in the detector portion.

FIG. 16 is a fragmentary horizontal sectional view through the base of computer 463 employing incandescent lamp light source 70, the wide-angle send-receive lenses 51 and 52 and associated mirrors 108 and 109 and beamsplitter 49 in the beam path section B and a transmission diffraction grating spectrometer and detector portion D at right.

In sequence of events, the incandescent lamp 70 emits broadband white light. The visible colors can be used, or for appearance sake, an optional filter 71 can be used to block visible colors and allow near infrared to be transmitted out wide-angle send-receive lenses 51 and 52 where they create flat fan-shaped beams of light which can be intercepted and retroreflected by an associated mouse.

Any return light received from the mouse at the computer 463 retraces, in reverse order, the paths where it is reflected by 50/50 beamsplitter 49 if received from lens 51, or transmitted through beamsplitter 49 if received from lens 52, into the spectrometer portion D of the computer 463 base. On entering the spectrometer D, the broad-spectrum light is transmitted through transmission diffraction grating 130 which diffracts different wavelengths, or colors, at different angles, typically in the first order beam to be reflected off of front-surface mirror 127.

The angular spread of the colored light can be increased by a negative cylindrically curved lens 131, which is an alternate to the functionally similar cylindrical mirror 134 and 126 in FIGS. 14 and 15, respectively. Colored light continues to the linear photodetector 123a–e for analysis in response in the same manner as described above to provide various mouse functions. The electrical output terminal of the linear photodetector array provides the corresponding mouse signals as is needed by the computer.

In most of the foregoing embodiments, the cylindrical wide angle send-receive lenses are shown schematically in the mice and computer bases, whereas a different optical design may involve alternate optical elements as in FIGS. 4 and 14. The function of the wide-angle lenses is to receive light over a wide flat, fan shaped area of the work surface and to form a line of light in the mouse, or computer, which is used as the equivalent of a slit by the diffraction gratings and prism. The wide-angle lenses are shown as a representative technique for light collection, and transmission, however, a simple vertical blade of transparent glass or plastic could well serve as the optical window in the mouse to pass light from outside the mouse, or computer, to the interior where it serves as the optical equivalent of a slit of light.

Reflective optics, for example the reflective diffraction gratings, front-surface flat and cylindrically-convex mirrors and off-axis parabolic mirrors can be conventionally aluminized glass, metal, or plastic molded components which are assembled into the mouse enclosure.

The present cost of an original diffraction grating master would exclude its use in a mouse marketed to the typical computer user. Therefore, the diffraction gratings which have been referred to, to this point, are preferred to be replicas which are coated typically with gold or aluminum to increase reflectivity. These diffraction grating replicas are functionally equivalent to the more costly originals.

To further reduce the cost of price-sensitive mice, the reflective optics, for example front-surface mirrors, off-axis parabolic mirrors and the reflection diffraction gratings of several embodiments can be molded as part of the mouse housing 13 and 130. This greatly reduces the part count and manufacturing cost. Preferably, the mouse housing and cover should be injection molded of black or dark-colored plastic to absorb internal stray light, and selected areas of the mirrors and grating flashed with aluminum to increase reflectivity. Suitable light barriers may be molded directly into the mouse housing, where needed, to baffle stray light as is illustrated in FIGS. 4 for the mice and 13, 15 and 16 for the computer.

For appearance purposes, a conventionally light-colored mouse exterior shell can contain an optical structure molded from a light-absorbing dark-colored plastic. Alternately, the housing could be molded in a conventional light-colored plastic, and the interior can be selectively flashed with aluminum on the optical surfaces and the remainder of the interior surface, can be masked and spray painted black for stray light absorption.

An optical retroreflector as used in this invention is a device, object or material which returns light nominally to the source. Retroreflectors are available in inexpensive flexible sheet form with adhesive backing. An example is the sheet material sold under the trademark Scotchbrite by the 3M Corporation of St. Paul, Minn. which is made of glass microspheres, which reflects approximately 1600 times more light than a matte-white reference surface. An alternate and preferred material is three times brighter yet; Reflexite flexible plastic sheeting, made by the Reflexite Corporation of New Britain, Conn., the surface of which is molded with thousands of microscopic corner cube reflectors as indicated in FIG. 18A by retroreflector 38. In this material, light enters a pocket made up of three mutually-perpendicular mirrors to form small reflective internal corners. The light sequentially reflects once each off of the three faces where it emerges out of the pocket and returns, slightly offset, nominally parallel to the path of the entrance beam.

Molded retroreflectors, while being highly efficient, are not perfect, due to molding irregularities, etc. and therefore return a Gaussian distribution, rather than a spot, of light from a point light source. This can be advantageous in allowing the source optics 136, as in FIG. 14 being used to guide light in and out of the computer base, to be near, rather than optically superimposed over the detector optics 138 in the base of the computer. This avoids the 50% light loss due to beamsplitters in FIGS. 1–3, 5, 6, 10, 11, 13, 15 and 16 and eliminates the need for and cost of mirrors and wide-angle lenses, and the optical noise from first and second-surface reflections in the lenses.

One objective, in designing the optics for these retroreflective mice, is to try to minimize first and second-surface reflections due to light impinging on refractive elements, such as lenses and bandpass filters, normal or perpendicular to the surfaces. These reflections will return light to the computer, and will be interpreted by the computer as optical noise and will interfere with the computer detecting the optical signal from the retroreflection at the chopper wheels and mouse-button shutter, creating a classical signal-to-noise problem encountered frequently in analog electrical circuits.

One way to minimize these reflections is by using efficient anti-reflection coatings on all refractive surfaces such as on cylindrical lenses 18, 19, 21 and 22 and spherical lenses 32, 35, 42 and 45, and bandpass filters 31, 34, 41 and 44 in FIG. 2. A further technique can be used to minimize unwanted reflections on the bandpass filters 31, 34, 41 and 44 by tilting the filters at a slight angle of perhaps 2–5° so that the first and second-surface reflections reflect into an unused portion of the mouse. This tilting technique has no effect on the direction of the desired transmitted beam and has little effect on the color which shifts slightly due to the apparent increase in spacing in the multi-layers of the filters.

An even better way to minimize optical noise is to not use refractive elements by substituting as many reflective elements as possible in a slightly altered design, as shown in FIG. 4 which represents a major improvement in the design over mouse of FIGS. 1 and 2. By comparing FIGS. 2 and 4, notice in FIG. 2 that both the dichroic beamsplitter 30, and spherical lens 32 whose first and second surfaces reflect light creating optical noise, have been replaced in FIG. 4 by a single off-axis parabolic mirror 63C which can be molded into the mouse. Also, in FIG. 2, the first-surface mirror 29 and spherical lens 35 have been replaced in FIG. 4 with a single off-axis parabolic mirror 65B. Dichroic beamsplitter 40 and spherical lens 42, in FIG. 2, have been replaced with a single off-axis parabolic mirror 47Y in FIG. 4, and first-surface mirror 39 and spherical lens 45, in FIG. 2, have been replaced with a single off-axis parabolic mirror 48R in FIG. 4. Further, dichroic beamsplitter 37, in FIG. 2, has been eliminated compared to the direct path approach to illuminating the shutter in FIG. 4.

Notice in FIG. 4, that the single diffraction grating efficiently creates the entire spectrum as opposed to, in FIG. 2, the light energy in optical paths I & II being subtracted from the "white" light by being reflected by multiple color-specific dichroic beamsplitters 30, 37 and 40. In FIG. 4, by molding the diffraction grating 61 and off-axis parabolic mirrors 47Y, 48R, 63C and 65B into the mouse housing 60, thirteen optical components in FIG. 2 are eliminated, taking into account that colored filters 31, 34, 41 and 44 of FIG. 2 are not needed in the mouse of FIG. 4 because of the function of the diffraction grating 61.

Another example of off-axis reflective optics being an improvement over refractive optics can be seen by noticing the function of cylindrically curved mirror 101 in FIGS. 5 and 6, and mirror 126 in computer base 363 in FIG. 15. The convexed mirrors are angled so as to not reflect light back along the entrance beam, but to provide the function of increasing the angular spread of the spectrum of light. Compare this to the use of the cylindrically curved negative lens 131 in computer base 463 in FIG. 16 which has been included here for completeness. If this lens were used in the send-receive path of a mouse, it would create first and second-surface reflections. Further, a cylindrical lens is more expensive than a cylindrically convexed mirror, because the lens has two optical surfaces which must be optically true, as opposed to the single optical surface of a convexed mirror, which also can be molded into the housing at virtually no additional cost.

Also in the mouse, the use of corner-cube retroreflectors, with the corner-cube side, rather than the smooth side (assuming the use of transparent material), toward the light source, assures that no undesirable first-surface reflections or optical noise is returned to the computer.

Further, the incident optical path at the mouse chopper wheels can be tipped approximately 5° so that any reflections off of the bandpass filters or specular faces of the chopper wheels will be reflected to unused portions of the mouse interior.

Diffraction gratings are efficient in separating white light into its spectral components, and especially with the option of inexpensively molding the diffraction grating surface in the mouse and computer spectrometer it is particularly attractive to use in the cordless mouse technique of this invention.

However, diffraction gratings are sensitive to temperature changes which affects the spacing of the parallel facets and therefore the angle of the reflected color, and therefore the intensity of a specific color at a fixed photodetector position. To minimize this problem, as broad a section of the spectrum as possible is used for each discrete color. The infrared region can be used from approximately 650 to 1100 nm. For a one-button mouse (5 wavelengths required) this safely provides 50 nm wide bands of energy with 50 nm guard bands to assure no cross talk. The photodetectors also can be physically large so as to intercept the path of the intended color even as the diffraction gratings in the computer or mouse change spacing and performance during operation. This eliminates user calibration, a requirement in classical spectrometers.

In FIG. 13, a pair of windows 51 and 52 in the form of wide angle lens are shown positioned in the housing wall 163 to radiate optical signals passing through a partially reflected, half silvered mirror 49 in transmitted radiation path T. In this case, as distinguished from the two internal paths in the mouse 10, the path T provides transmitted radiation from one or more light sources such as a series of light emitting diodes, LED's 122a–e, each having a distinguishable discrete spectral frequency. Where multiple LED's are used, they may be clustered in light path T as illustrated in FIG. 14, or offset from light path T and combined in light path T through the use of beamsplitters such as dichroic beamsplitters 105a–d in FIG. 13.

An alternate embodiment of radiation source and detector is shown in FIG. 15 in which a broad-spectrum light source such as a simple small incandescent lamp 70 is used. Preferably, light from lamp 70 is passed through a filter 71 which blocks most of the visible spectrum and passes the non-visible infrared and/or ultraviolet ends of the spectrum with little attenuation. This will allow an associated mouse 10 to be operated without visually distracting the computer user. The beamsplitter 49 of FIGS. 13, 15, and 16 allows light to be projected out of the mouse out of both windows 51 and 52 and allows the computer to receive retroreflected incoming light to be transmitted to the photodetectors. Such return radiation, in the form of pulses of light due to rotation of mouse ball 11, is reflected by mirrors to the path-detector section D to the various detectors 173a–e of 15. Typical selections of an operative set of filters and detectors is identified in FIG. 13 as 113a–e.

Figure 17:
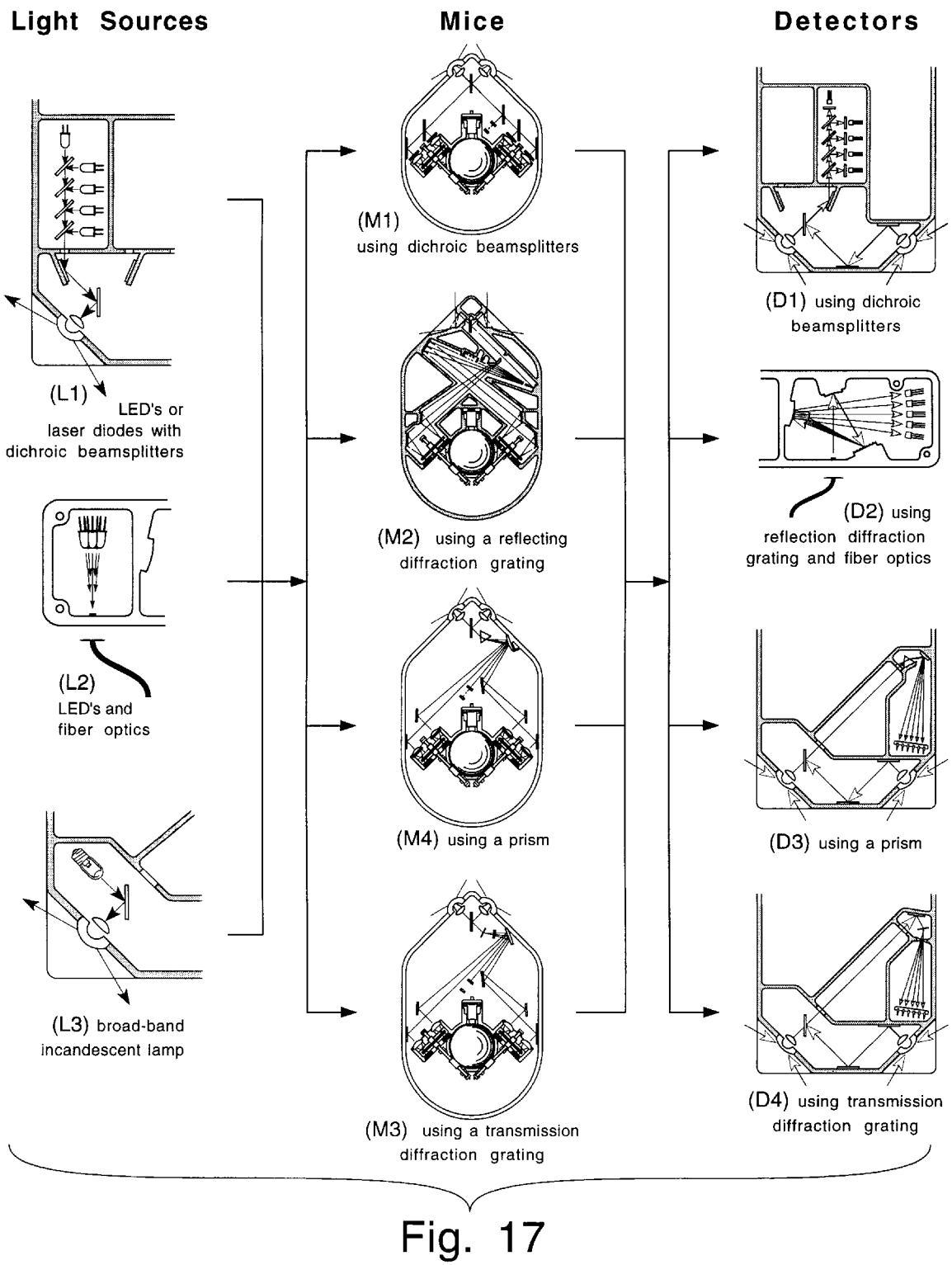
FIG. 17 is a system design chart which illustrates general light-source, mouse and detector technology, and showing that all light sources are functionally identical, all mice are functionally identical, and all detectors are functionally identical, and that any combination of light source, mouse and detector technology can be mixed and matched following the teaching of this invention to form a system constituting an optically retroreflective mouse-controlled computer system in accordance with this invention.

The interchangeability of elements of energy source, mouse, and photo detector is illustrated in FIG. 17. Light sources, LED's of L1 and L2 or the broad-band incandescent lamp of L3 may be used with any of the mouse optics subsystems of M1 through M4. The retroreflected optical signal from any of the mice M1 through M4 may be processed using any of the optical-detector subsystems of D1 through D4 using dichroic beamsplitters D1, reflective a diffraction grating D2, a prism D3 or transmission diffraction grating D4. This flexibility allows the selection of the optimal system depending upon system requirements and cost. The preferred combination is based on L2 plus M2 plus D2, of FIG. 17.

In each of the foregoing embodiments, the light chopper wheels 26 and 27 of FIGS. 1–6, 10 and 11 have been illustrated as perforated rotatable discs which allow radiant energy arriving at their associated positive spherical lenses 31, 35, 41 and 45 with light passing through openings to be reflected by retroreflectors 33, 38, 43 and 46. This is also shown in FIG. 18A. The equivalent operation can be accomplished by employing the combination of FIG. 18B. The chopper wheel 27A of this figure is notched at 27N and light, after passing through lens 35 reaching any notch 27N, travels without reflection beyond the wheel 27A and is absorbed and not reflected in the housing walls or other light absorber, not shown. The lenses 32 and 35 focus the incident light at the near surface of the wheel 27A. The surface of this wheel is covered or molded with retroreflectors. Light which is focused on the surface of the chopper wheel 27A is reflected back through lens 35 whenever the unnotched portions of the wheel 27A is aligned with the optical path which is indicated by the double arrows in FIG. 18B. Either form of chopper wheel is effective to modulate, i.e., chop the incident light whenever the ball 11 of FIGS. 1–6, and 10 is rotated. The preferred embodiment is shown in FIG. 18A.

The above described embodiments of the present invention are merely descriptive of its principles and are not to be considered limiting. The scope of the present invention instead shall be determined from the scope of the following claims including their equivalents.

What is claimed is:

1. For use with a computer having a source of radiant optical energy and a detector for detecting returned modulated radiant optical energy as control signal,
a mouse comprising:
   a housing;
   an opening in said housing;
      means defining an optical path for radiant energy entering the opening in said housing;
      means for modulating optical radiant energy entering the opening in said housing of said mouse as a result of the manual operation of said mouse;
      a retroreflector in said optical path for retroreflecting modulated optical radiant energy outward through the opening in said housing for control of the computer.

2. A mouse in accordance with claim 1 including means for receiving an optical signal comprising energy of at least two different distinguishable wavelengths of the optical spectrum;
   means coupling said receiving means to said housing for modulating said different wavelengths of the optical spectrum responsive to manual operation of said mouse; and
   said retroreflector operating to retroreflect modulated energy of different wavelengths of the optical spectrum as a signal representing manual operation of said mouse.

3. An optically retroreflective computer including means for receiving an optical signal comprising energy of at least two different distinguishable wavelengths of the optical spectrum;
   means for housing said receiving means;
   means coupling said receiving means to said housing for modulating said different wavelengths of the optical spectrum responsive to movement of said mouse; and
   means for retroreflecting said modulated energy of different wavelengths of the optical spectrum as a signal representing movement of a mouse;
   wherein said modulating means comprises means for interrupting the energy of different wavelengths of the optical spectrum as a function of mouse movement.

4. An optically retroreflective computer mouse including means for receiving an optical signal comprising energy of at least two different distinguishable wavelengths of the optical spectrum;
   means for housing said receiving means;
   means coupling said receiving means to said housing for modulating said different wavelengths of the optical spectrum responsive to movement of said mouse; and
   means for retroreflecting said modulated energy of different wavelengths of the optical spectrum as a signal representing movement of a mouse;
   wherein said receiving means comprises lens means for receiving incident radiant energy in said different wavelengths within a predetermined range of angles of incidence and for conveying said radiant energy to at least one preselected path within said housing toward said retroreflecting means.

5. An optically retroreflective computer mouse including means for receiving an optical signal comprising energy of at least two different distinguishable wavelengths of the optical spectrum;
   means for housing said receiving means;
   means coupling said receiving means to said housing for modulating said different wavelengths of the optical spectrum responsive to movement of said mouse; and
   means for retroreflecting said modulated energy of different wavelengths of the optical spectrum as at least one signal representing movement of a mouse;
   wherein said different wavelength modifying means including a light chopper wheel for each of at least two of the different wavelengths;
   said light chopper wheels being located in the light paths of said different wavelengths and coupled to said housing to interrupt the retroreflected different wavelengths as a function of movement of said mouse.

6. An optically retro-reflective computer mouse in accordance with claim 5 including a respective retroreflector located in a light path within said housing for each of said different wavelengths interrupted by said light chopper wheels whereby the retroreflection of each different wavelength is interrupted and constitutes a control signal for a computer.

7. An optically retroreflective computer mouse in accordance with claim 5 wherein an additional different wavelength light paths is defined in said mouse including a retroreflector and a shutter for interrupting said additional different wavelength light path; and
   means for operating said shutter to provide an optical command signal from said mouse.

8. An optically retroreflective computer mouse in accordance with claim 7 wherein said means for operating said shutter comprises a manually operated button.

9. An optically retroreflective computer mouse including means for receiving an optical signal comprising energy of at least two different distinguishable wavelengths of the optical spectrum;
   means for housing said receiving means;
   means coupling said receiving means to said housing for modulating said different wavelengths of the optical spectrum responsive to movement of said mouse; and
   means for retroreflecting said modulated energy of different wavelengths of the optical spectrum as a signal representing movement of a mouse; wherein said receiving means includes means responsive to a broad band of received optical wavelengths and for separating the wavelengths into said at least two discrete wavelengths and for establishing different paths for each of said at least two discrete wavelengths for separate retroreflection within said housing.

10. A pointing-device controlled computer including a computer housing having an optical window therein, a source of optical radiation within said housing and radiating at least two discrete wavelengths through said window;
    means for radiating the at least two discrete wavelengths through said window into a field accessible to a computer user;
    an external mouse including means for receiving discrete wavelengths from within at least a portion of said field and for retroreflecting optical energy to said computer; and
    means in said computer for detecting modified retroreflected optical radiation in at least one of said two discrete wavelengths, wherein the retroreflected optical radiation from the mouse constitutes a control signal for said computer.

11. A pointing-device controlled computer in accordance with claim 10 wherein said source of optical radiation includes a lamp producing substantially white light.

12. A pointing-device controlled computer in accordance with claim 10 wherein said source of optical radiation comprises a plurality of radiation sources, each producing a band of optical wavelengths which includes a different one of said discrete wavelengths.

13. A pointing-device controlled computer in accordance with claim 10 wherein said discrete wavelength radiation source comprises a series of LED's.

14. A pointing-device controlled computer including a source of optical radiation including at least two discrete wavelengths;
   means for radiating the at least two discrete wavelengths into a field accessible to a computer user;
   means for detecting retroreflected discrete wavelengths in at least a portion of said field; and
   means for detecting modified retroreflected optical radiation in at least one of said two discrete wavelengths, wherein the retroreflected optical radiation constitutes a control signal for said computer;
   wherein said detecting means comprises a series of photodetectors, each responsive to a different one of said discrete wavelengths.

15. A pointing-device controlled computer in accordance with claim 14 wherein said photodetectors produce electrical signals corresponding to the modification of the radiated discrete wavelength from the reflected radiations wherein said electrical signal constitute the control signal for said computer.

16. A pointing-device controlled computer including a source of optical radiation including at least two discrete wavelengths;
   means for radiating the at least two discrete wavelengths into a field accessible to a computer user;
   means for detecting reflected discrete wavelengths in at least a portion of said field; and
   means for detecting modified retroreflected optical radiation in at least one of said two discrete wavelengths, wherein the retroreflected optical radiation constitutes a control signal for said computer;
   including a pointing-device constituting an optically retroreflective mouse.

17. A pointing-device controlled computer including a source of optical radiation including at least two discrete wavelengths;
   means for radiating the at least two discrete wavelengths into a field accessible to a computer user;
   means for detecting retroreflected discrete wavelengths in at least a portion of said field; and
   means for detecting modified retroreflected optical radiation in at least one of said two discrete wavelengths, wherein the reflected optical radiation constitutes a control signal for said computer;
   including a pointing-device constituting a manually controllable housing enclosing optically retroreflecting means responsive to each of the discrete wavelength bands radiated by said computer;
   means within said pointing device housing for modifying radiation from said computer; and
   means for modulating retroreflection as a function of movement of said pointing device.

18. A pointing device controlled computer in accordance with claim 15 wherein said pointing-device includes means exposed at the exterior of said pointing device for receiving optical radiation from said computer over an acceptance angle and for directing received radiation into an optically retroreflective path within said pointing device for modification of the radiation responsive to the movement of the pointing device and reradiation of the modified radiation within the acceptance angle of the pointing device.

19. A pointing device controlled computer in accordance with claim 15 wherein said pointing device includes optical means for separating each of the discrete wavelengths into different paths within the pointing device.

20. A pointing device controlled computer in accordance with claim 18 wherein said pointing device includes optical means of establishing at least two retroreflective optical paths within said pointing device for each of said discrete wavelengths, one each of said optical paths including means for modulating the optical radiation within their respective paths as a function of movement of said pointing device.

21. A cordless optical mouse for use on a support surface comprising:
   a mouse housing;
   at least one optical window in said housing for receiving incident optical energy;
   a ball mounted in said housing with a portion exposed for rotation through contact with the supporting surface for the mouse;
   a pair of optical shutters mounted for rotation responsive to rotation of the ball; and
   an optical system within said housing for receiving optical energy entering said at least one window and for transmitting the received optical energy to said optical shutters and for reflecting and retransmitting optical energy out of said at least one window, which optical energy may be periodically modified by said optical shutters.

22. A cordless optical mouse in accordance with claim 21 wherein said pair of optical shutters comprise a pair of perforated disks each mounted on its own respective shaft and which is rotatable by contact with the ball.

23. A cordless optical mouse in accordance with claim 21 wherein said window includes a optical means defining the acceptance angle of the cordless optical mouse.

24. A cordless optical mouse in accordance with claim 21 including a pair of adjacent openings in said housing with a partially reflective mirror therebetween; and
   wherein said optical system includes means defining a first optical path for conveying optical energy arriving from either of said openings and conveying such optical energy to both of said optical shutters and for returning reflected optical energy to both of said openings responsive to reflection of incident optical energy encountering said optical shutters.

25. A cordless optical mouse in accordance with claim 21 wherein said optical shutters comprise rotatable perforated disks and said optical system transmits received optical energy through a multiplicity of openings in said optical shutters at substantially the same time to provide an indication of the direction of rotation of said shutters and said ball.

26. A cordless optical mouse in accordance with claim 21 wherein said optical shutters are mounted with substantially orthoginal axes of rotation.

27. A cordless optical mouse in accordance with claim 21 wherein said optical system employs retroreflectors positioned to receive and reflect optical energy passing through said optical shutters.

28. A cordless optical mouse in accordance with claim 21 wherein said optical system employs a diffraction grating for separating received optical radiation into a plurality of discrete readily distinguishable color bands; and
   said optical system includes means defining separate paths for said distinguishable color bands for effecting different return optical signals.

29. A cordless optical mouse in accordance with claim 21 wherein said optical system employs a prism positioned in said path for separating received optical radiation into a plurality of discrete readily identifiable color bands; and said optical system includes means defining separate paths for said identifiable color bands for effecting different return optical signals.

30. A cordless optical mouse in accordance with claim 21 including at least one manually operated button on said housing;

said button being operatively connected to a movable shutter;

said movable shutter being located in a discrete optical path in said mouse for interrupting radiation received in said opening whereby said manually controlled button constitutes a control signal source for said mouse.

31. A cordless optical mouse in accordance with claim 21 wherein said optical system defines a first optical path within said mouse housing for incident optical radiation past an optical shutter and an optical reflector and a different return path for reflected incident energy from said optical reflector to said opening.

32. A cordless optical mouse in accordance with claim 21 wherein said optical path is defined in part by a fiber optic conductor.

33. A cordless optical mouse in accordance with claim 21 wherein said optical system includes:

a pair of cylindrical reflectors positioned to receive wide angle light and reflect a substantially collimated beam of light;

said beam of light directed through said window.

34. A cordless optical mouse in accordance with claim 33 wherein said cylindrical reflectors are positioned at the exterior of said housing on opposite sides of the window in said housing.

35. A cordless optical mouse in accordance with claim 34 wherein one of said cylindrical reflectors is exposed to wide angled of received incident optical energy and said second cylindrical reflector reflects said optical energy and further reduce the wide angle of received incident optical energy to form an essentially collimated beam directed at said window of said housing.

36. A cordless optical computer mouse system comprising:

a computer including a source of optical radiation energy of predetermined spectrum and a receiver for detecting returned optical radiation energy in said predetermined spectrum;

said source of optical radiation energy and receiver for detecting returned optical radiation energy being positioned to radiate and receive optical radiation energy in a field accessible to the computer user; and an optically retroreflective cordless mouse associated with said computer by being located in said field accessible to the computer user;

said mouse including a housing having an optical window in said housing, a ball for contacting a supporting surface for said mouse;

said mouse further including a retroreflective optical system within said mouse housing responsive to said mechanical movement indicative of movement of said ball to reflect the optical radiant energy received at said optical window;

said retroreflective optical system including means to modulate the incident optical radiant energy as a control signal for said computer.

37. A system in accordance with claim 36 wherein said computer source of optical radiation energy comprises an incandescent bulb producing generally white light and said mouse includes means for separating incident optical radiation from said computer into discrete bands of optical radiant energy and utilizes a plurality of said bands as individual control signals for said computer; and wherein the receiver of said computer includes means responding to said discrete bands as different control signals for said computer.

38. A computer system in accordance with claim 36 wherein said source of optical energy constitutes a plurality of discrete wavelength band radiators and said optical radiant energy receiver is responsive to said discrete wavelength band of said source.

39. In an optically retro-reflective mouse controlled computer system with an associated mouse for operation by a computer user, an ambidextrous optical retroreflective computer mouse comprising:

a manually operable housing for introducing control signals into its associated computer;

a rotatable ball mounted within said housing with a surface of the ball protruding from the housing to be movable relative the housing to introduce computer control signals;

said housing having a plurality of windows for receiving incident light energy from said computer a retroreflective optical system within said mouse housing coupled to said rotatable ball to modify received optical energy as a function of movement of said rotatable ball; and selector means for enabling either one of said windows for the introduction of incident optical energy into said retroreflective optical system.

40. A system in accordance with claim 39 wherein said selector means comprises a rotatable mirror pivotally secured within said housing for directing optical energy from one window into said retroreflective optical system while blocking the entrance of optical energy from the exterior of said housing into the retroreflective optical system within the housing arriving via any other housing window.

41. A system in accordance with claim 39 wherein said housing is designed to be left or right hand grasped includes a pair of windows in a region thereof normally exposed to the associated computer source of optical energy.

\* \* \* \* \*